(12) United States Patent
Yang et al.

(10) Patent No.: US 11,662,991 B2
(45) Date of Patent: May 30, 2023

(54) VEHICLE-MOUNTED DEVICE UPGRADE METHOD AND RELATED DEVICE

(71) Applicant: Huawei International Pte. Ltd., Singapore (SG)

(72) Inventors: Yanjiang Yang, Singapore (SG); Zhuo Wei, Singapore (SG); Hsiao-Ying Lin, Singapore (SG); Tieyan Li, Singapore (SG); Junqiang Shen, Shenzhen (CN)

(73) Assignee: Huawei International Pte. Ltd., Singapore (SG)

( * ) Notice: Subject to any disclaimer, the term of this patent is extended or adjusted under 35 U.S.C. 154(b) by 178 days.

(21) Appl. No.: 16/856,897

(22) Filed: Apr. 23, 2020

(65) Prior Publication Data

US 2020/0264864 A1 Aug. 20, 2020

Related U.S. Application Data

(63) Continuation of application No. PCT/SG2017/050530, filed on Oct. 24, 2017.

(51) Int. Cl.
*G06F 8/65* (2018.01)
*H04W 4/40* (2018.01)
(Continued)

(52) U.S. Cl.
CPC .............. *G06F 8/65* (2013.01); *H04L 9/083* (2013.01); *H04L 9/30* (2013.01); *H04L 9/3242* (2013.01);
(Continued)

(58) Field of Classification Search
CPC ........... G06F 8/65; H04W 4/40; H04W 76/10; H04L 9/083; H04L 9/30; H04L 9/3242;
(Continued)

(56) References Cited

U.S. PATENT DOCUMENTS 6,947,556 B1 * 9/2005 Matyas, Jr. ......... G06F 21/6209
380/281
8,296,584 B2 10/2012 Bosch et al.
(Continued)

FOREIGN PATENT DOCUMENTS

CN 102158544 A 8/2011
CN 102930004 B 7/2015
(Continued)

OTHER PUBLICATIONS

Karthik et al, "Uptane: Securing Software Updates for Automobiles", 2016, [Online], pp. 1-11, [Retrieved fron internet on Jan. 31, 2023], <https://uptane.github.io/papers/kuppusamy_escar_16.pdf> (Year: 2016).*

(Continued)

*Primary Examiner* — S. Sough
*Assistant Examiner* — Zengpu Wei
(74) *Attorney, Agent, or Firm* — Leydig, Voit & Mayer, Ltd.

(57) ABSTRACT

A vehicle-mounted device upgrade method and a related device. The method may be applied to a vehicle-mounted system, a vehicle-mounted control device and one or more to-be-upgraded vehicle-mounted devices, and the method may include: obtaining, by the vehicle-mounted control device, a vehicle-mounted upgrade package, where the vehicle-mounted upgrade package includes a plurality of upgrade files, and each upgrade file is used to upgrade at least one to-be-upgraded vehicle-mounted device; performing, by the vehicle-mounted control device, security verification on the plurality of upgrade files; and sending, by the vehicle-mounted control device, a target upgrade file to a target to-be-upgraded vehicle-mounted device that is to be upgraded by using the target upgrade file, where the target upgrade file is an upgrade file on which security verification (Continued)

succeeds in the plurality of upgrade files. According to this application, the vehicle-mounted device can be securely and efficiently upgraded.

15 Claims, 7 Drawing Sheets

(51) Int. Cl.
| | |
|---|---|
| *H04W 76/10* | (2018.01) |
| *H04L 9/08* | (2006.01) |
| *H04L 9/30* | (2006.01) |
| *H04L 9/32* | (2006.01) |
| *H04L 9/40* | (2022.01) |

(52) U.S. Cl.
CPC ........ *H04L 9/3247* (2013.01); *H04L 63/0428* (2013.01); *H04L 63/08* (2013.01); *H04L 63/18* (2013.01); *H04W 4/40* (2018.02); *H04W 76/10* (2018.02); *H04L 2209/80* (2013.01); *H04L 2209/84* (2013.01)

(58) Field of Classification Search
CPC ... H04L 9/3247; H04L 63/0428; H04L 63/08; H04L 63/18; H04L 2209/80; H04L 2209/84
USPC ......................................................... 717/169
See application file for complete search history.

(56) References Cited

U.S. PATENT DOCUMENTS

| | | | |
|---|---|---|---|
| 8,356,178 B2 | 1/2013 | Hars | |
| 8,559,630 B2 | 10/2013 | Ramasamy et al. | |
| 8,782,441 B1 | 7/2014 | Osterwalder et al. | |
| 9,559,837 B2 | 1/2017 | McGregor et al. | |
| 2005/0256614 A1 | 11/2005 | Habermas | |
| 2009/0300595 A1 | 12/2009 | Moran et al. | |
| 2011/0320089 A1 | 12/2011 | Lewis | |
| 2014/0250066 A1* | 9/2014 | Calkowski | H04L 67/06 707/624 |
| 2014/0282470 A1 | 9/2014 | Buga et al. | |
| 2015/0113520 A1 | 4/2015 | Kotani et al. | |
| 2015/0169604 A1 | 6/2015 | Oh et al. | |
| 2015/0200804 A1 | 7/2015 | Lee et al. | |
| 2015/0220321 A1* | 8/2015 | Jung | G06F 8/65 717/169 |
| 2016/0092701 A1* | 3/2016 | Shah | H04L 63/0823 713/189 |
| 2016/0330032 A1* | 11/2016 | Naim | G06F 21/85 |
| 2016/0344705 A1 | 11/2016 | Stumpf et al. | |
| 2017/0139778 A1 | 5/2017 | Kito et al. | |
| 2017/0192770 A1 | 7/2017 | Ujiie et al. | |
| 2017/0212746 A1 | 7/2017 | Quin et al. | |
| 2017/0242678 A1* | 8/2017 | Sangameswaran | G06F 8/65 |
| 2017/0351666 A1* | 12/2017 | Loring | H04L 67/06 |
| 2019/0007215 A1* | 1/2019 | Hakuta | H04W 12/069 |
| 2019/0057214 A1* | 2/2019 | Xia | H04W 12/06 |
| 2019/0075423 A1* | 3/2019 | Hrabak | H04W 4/023 |

FOREIGN PATENT DOCUMENTS

| | | | |
|---|---|---|---|
| CN | 105637803 | A | 6/2016 |
| CN | 106021462 | A | 10/2016 |
| CN | 106168899 | A | 11/2016 |
| CN | 106257416 | A | 12/2016 |
| CN | 106385420 | A | 2/2017 |
| CN | 106528125 | A | 3/2017 |
| CN | 106790053 | A | 5/2017 |
| CN | 107026833 | A | 8/2017 |
| CN | 108200044 | A | 6/2018 |
| CN | 108337234 | A | 7/2018 |
| EP | 2863303 | A1 | 4/2015 |
| JP | 2002144983 | A | 5/2002 |
| JP | 2003202931 | A | 7/2003 |
| JP | 2015079440 | A | 4/2015 |
| JP | 2017017616 | A | 1/2017 |
| WO | 2002047272 | A2 | 6/2002 |
| WO | 2010024379 | A1 | 3/2010 |
| WO | 2015133814 | A1 | 9/2015 |
| WO | 2017006862 | A1 | 1/2017 |
| WO | 2017030886 | A1 | 2/2017 |
| WO | 2019083440 | A2 | 5/2019 |
| WO | 2019182509 | A1 | 9/2019 |
| WO | 2019212403 | A1 | 11/2019 |

OTHER PUBLICATIONS

Mckenna et al., "Making Full Vehicle OTA Updates a Reality," NXP, White Paper, total 18 pages (May 2016).

* cited by examiner

VEHICLE-MOUNTED DEVICE UPGRADE METHOD AND RELATED DEVICE

CROSS-REFERENCE TO RELATED APPLICATIONS

This application a continuation of International Application No. PCT/SG2017/050530, filed on Oct. 24, 2017, the disclosure of which is hereby incorporated by reference in its entirety.

TECHNICAL FIELD

This application relates to the field of vehicle-mounted technologies, and in particular, to a vehicle-mounted device upgrade method and a related device.

BACKGROUND

In the future, each vehicle may act as a network node on the interne of vehicles and may be substantially the same as a web-connected device such as a computer or a mobile phone. It is estimated that 60% to 70% of vehicle recalls in North America are caused by firmware/software problems. Therefore, upgrading firmware/software of a vehicle-mounted device is an indispensable step. A conventional to-be-upgraded vehicle-mounted device vehicle is recalled for firmware/software upgrade. Such a method has disadvantages of high costs and a long cycle.

Therefore, for a future vehicle-mounted device, more flexible remote upgrades need to be implemented by using an over-the-air (OTA) technology, just like remote upgrades performed for a computer and a mobile phone today. Remote firmware/software upgrades for a vehicle-mounted device may bring many benefits. For example, such upgrades would help quickly fix key firmware/software bugs, improve vehicle safety, and add a new function or feature in a timely manner to the vehicle during an entire service life. Therefore, in this OTA manner, firmware/software upgrades can be implemented without recalling the vehicle. This can reduce a lot of costs for a vehicle manufacturer or retailer and also bring convenience to a vehicle owner.

However, during a remote upgrade for a to-be-upgraded vehicle-mounted device, because some to-be-upgraded vehicle-mounted devices have problems such as a limited computation capability or limited storage space, efficiency in upgrades for the to-be-upgraded vehicle-mounted devices is relatively low, even affecting upgrades of an entire vehicle-mounted system. Therefore, how to ensure secure and efficient firmware/software upgrades for a vehicle-mounted device is a problem that needs to be urgently resolved.

SUMMARY

Embodiments of the present invention provide a vehicle-mounted device upgrade method and a related device, to resolve a problem that secure and efficient firmware/software upgrades for a vehicle-mounted device cannot be implemented.

According to a first aspect, an embodiment of the present invention provides a vehicle-mounted device upgrade method, which may include:

obtaining, by a vehicle-mounted control device, a vehicle-mounted upgrade package, where the vehicle-mounted upgrade package includes a plurality of upgrade files, and each upgrade file is used to upgrade at least one to-be-upgraded vehicle-mounted device; performing, by the vehicle-mounted control device, security verification on the plurality of upgrade files; and sending, by the vehicle-mounted control device, a target upgrade file to a target to-be-upgraded vehicle-mounted device that is to be upgraded by using the target upgrade file, where the target upgrade file is an upgrade file on which security verification succeeds in the plurality of upgrade files. According to this embodiment of the present invention, on a vehicle-mounted control device side, security verification processing is performed on a vehicle-mounted upgrade package required for upgrading a vehicle-mounted device, to prevent to-be-upgraded vehicle-mounted devices having different upgrade capabilities from participating in a security verification process, thereby ensuring that the vehicle-mounted device is securely and efficiently upgraded by using the vehicle-mounted upgrade package.

In a possible implementation, the vehicle-mounted upgrade package includes a first digital signature; and the performing, by the vehicle-mounted control device, security verification on the plurality of upgrade files includes: performing, by the vehicle-mounted control device, digital signature verification on the plurality of upgrade files by using the first digital signature. In other words, the vehicle-mounted upgrade package is verified by using a digital signature, thereby ensuring validity of the vehicle-mounted upgrade package obtained from outside of a vehicle-mounted device by the vehicle-mounted control device.

In a possible implementation, the method further includes: sending, by the vehicle-mounted control device, identity authentication information to an upgrade server; and if the identity authentication information is authenticated by the upgrade server, establishing a secure channel between the vehicle-mounted control device and the upgrade server; and the obtaining, by a vehicle-mounted control device, a vehicle-mounted upgrade package from an upgrade server includes: obtaining, by the vehicle-mounted control device, the vehicle-mounted upgrade package from the upgrade server through the secure channel. In other words, a secure channel is established between the vehicle-mounted control device and the upgrade server, to ensure confidentiality of the vehicle-mounted upgrade package in a transmission process. In this case, the vehicle-mounted upgrade package does not need to be additionally encrypted.

In a possible implementation, the vehicle-mounted upgrade package is encrypted by using a first key, and the first key is a symmetric key; and the method further includes: obtaining, by the vehicle-mounted control device, the first key from a key server; and after the performing, by the vehicle-mounted control device, digital signature verification on the plurality of upgrade files by using the first digital signature, the method includes: decrypting, by the vehicle-mounted control device, the plurality of upgrade files by using the first key if the digital signature verification succeeds. In other words, the vehicle-mounted upgrade package is encrypted, and an encryption key is stored in a dedicated key server, thereby effectively ensuring confidentiality of the vehicle-mounted upgrade package in a transmission process.

In a possible implementation, the sending, by the vehicle-mounted control device, a target upgrade file to a target to-be-upgraded vehicle-mounted device that is to be upgraded by using the target upgrade file includes: dividing, by the vehicle-mounted control device, the target upgrade file into a plurality of upgrade subfiles; generating, by the vehicle-mounted control device, a plurality of mutually associated data blocks from the plurality of upgrade subfiles by using a preset algorithm, and generating a first message authentication code MAC of the plurality of data blocks by using a second key, where the second key is a symmetric algorithm key; and sequentially sending, by the vehicle-mounted control device to the target to-be-upgraded vehicle-mounted device, the plurality of data blocks that carry the first MAC. In other words, during transmission of the vehicle-mounted upgrade package between vehicle-mounted devices, an upgrade file is divided into a plurality of associated data blocks by using a preset algorithm, and MAC processing is performed on the associated data blocks, so that the vehicle-mounted control device divides a complete upgrade file into a plurality of data blocks that can be separately transmitted and on which validity verification can be separately performed. In addition, because the plurality of data blocks are associated, a data block that has a security problem can be quickly located by using a related algorithm. Therefore, computation workload and computation complexity in a unit time decrease for a to-be-upgraded vehicle-mounted device having a relatively weak capability. After an upgrade file transmission error occurs, an error part can be found as quickly as possible, so that only the error part rather than the entire upgrade file is requested to be retransmitted. In this way, secure and efficient upgrade for the vehicle-mounted device is further ensured.

In a possible implementation, the method further includes: encrypting, by the vehicle-mounted control device, each of the plurality of upgrade subfiles by using a third key; and the generating, by the vehicle-mounted control device, a plurality of mutually associated data blocks from the plurality of upgrade subfiles by using a preset algorithm includes: generating, by the vehicle-mounted control device by using the preset algorithm, the plurality of mutually associated data blocks from the plurality of upgrade subfiles that are encrypted by using the third key. Confidentiality of the vehicle-mounted upgrade package is further ensured while validity of the vehicle-mounted upgrade package is ensured, thereby preventing the vehicle-mounted upgrade package from being obtained by an unauthorized party.

In a possible implementation, the target upgrade file includes a plurality of upgrade subfiles, a plurality of mutually associated data blocks are generated from the plurality of upgrade subfiles by using a preset algorithm, and the plurality of upgrade subfiles carry a second digital signature of the plurality of data blocks that is generated by using a fourth key, where the fourth key is an asymmetric key; the performing, by the vehicle-mounted control device, security verification on the plurality of upgrade files includes: checking, by the vehicle-mounted control device, the second digital signature of the plurality of data blocks; and the sending, by the vehicle-mounted control device, a target upgrade file to a target to-be-upgraded vehicle-mounted device that is to be upgraded by using the target upgrade file includes: generating, by the vehicle-mounted control device, a second MAC of the plurality of data blocks by using a fifth key, where the fifth key is a symmetric algorithm key; and sequentially sending, by the vehicle-mounted control device to the target to-be-upgraded vehicle-mounted device, the plurality of data blocks that carry the second MAC. In other words, block transmission and signing of the vehicle-mounted upgrade package may be implemented on an upgrade developer side. That is, before obtained by the vehicle-mounted control device, data blocks are obtained through division by using a preset algorithm and signed. In this case, the vehicle-mounted device needs to first check validity of the data blocks, and then performs MAC processing on data blocks checked as valid. In this way, computation workload and computation complexity of the to-be-upgraded vehicle-mounted device decrease while validity of the vehicle-mounted upgrade file in an in-vehicle transmission process is ensured. Therefore, the vehicle-mounted device is securely and efficiently upgraded.

In a possible implementation, the preset algorithm includes any one of a hash chain algorithm, a hash tree algorithm, and a bloom filter algorithm. The preset algorithm uses a hash function of the foregoing algorithms, to divide the target upgrade file into a plurality of mutually associated data blocks. In this way, during MAC processing, MAC processing may be performed only on one of the plurality of data blocks, and other associated data blocks may be checked by using a hash value for mutual association.

In a possible implementation, the method further includes: retransmitting, by the vehicle-mounted control device, a target data block to the target to-be-upgraded vehicle-mounted device, where the target data block is a data block on which verification fails on the target to-be-upgraded vehicle-mounted device in the plurality of data blocks. Based on transmission of associated blocks, a data block on which verification fails can be quickly located, and when such a transmission error occurs, only a corresponding data block rather than the entire upgrade file needs to be requested again, thereby reducing overheads, improving upgrade efficiency, and ensuring upgrade security.

According to a second aspect, an embodiment of the present invention provides an intelligent vehicle, which may include a vehicle-mounted control device and at least one to-be-upgraded vehicle-mounted device, where
    the vehicle-mounted device is configured to obtain a vehicle-mounted upgrade package, perform security verification on a plurality of upgrade files in the vehicle-mounted upgrade package, and send a target upgrade file to a target to-be-upgraded vehicle-mounted device that is to be upgraded by using the target upgrade file, where each upgrade file is used to upgrade at least one to-be-upgraded vehicle-mounted device, and the target upgrade file is an upgrade file on which security verification succeeds in the plurality of upgrade files; and
    the to-be-upgraded vehicle-mounted device is configured to receive the target upgrade file sent by the vehicle-mounted control device, and perform secure upgrade by using the target upgrade file, where the to-be-upgraded vehicle-mounted device is the target to-be-upgraded vehicle-mounted device.

In a possible implementation, the vehicle-mounted control device is specifically configured to perform digital signature verification on the plurality of upgrade files by using the first digital signature. In other words, the vehicle-mounted control device of the intelligent vehicle in this embodiment of the present invention needs to check validity of the plurality of upgrade files in the vehicle-mounted upgrade package that is obtained from outside of the vehicle.

In a possible implementation, the vehicle-mounted control device is specifically configured to:
    send identity authentication information to the upgrade server, if the identity authentication information is authenticated by the upgrade server, establish a secure channel between the vehicle-mounted control device and the upgrade server, and obtain the vehicle-mounted upgrade package from the upgrade server through the secure channel; or the vehicle-mounted upgrade package is encrypted by using a first key, the first key is a symmetric key, and the vehicle-mounted control device is specifically configured to: obtain the first key from a key server, and after digital signature verification performed on the plurality of upgrade files by using the first digital signature succeeds, decrypt the plurality of upgrade files by using the first key. In other words, the vehicle-mounted control device of the intelligent vehicle in this embodiment of the present invention may establish a secure channel to a server end, to ensure security of a process of obtaining the vehicle-mounted upgrade package.

In a possible implementation, the vehicle-mounted control device is specifically configured to: divide the target upgrade file into a plurality of upgrade subfiles, generate a plurality of mutually associated data blocks by using a preset algorithm, generate a first message authentication code MAC of the plurality of data blocks by using a second key, and sequentially send, to the target to-be-upgraded vehicle-mounted device, the plurality of data blocks that carry the first MAC, where the second key is a symmetric algorithm key; and the to-be-upgraded vehicle-mounted device is specifically configured to: sequentially receive the plurality of data blocks that carry the first MAC and that are sent by the vehicle-mounted control device; sequentially perform verification on the plurality of data blocks based on the preset algorithm by using the second key; and when all the plurality of data blocks are verified, combine the plurality of sequentially verified data blocks for upgrade.

In other words, after verifying validity of the vehicle-mounted upgrade package obtained from outside of the vehicle, the vehicle-mounted control device of the intelligent vehicle in this embodiment of the present invention divides the upgrade file into blocks and performs MAC processing inside the vehicle, to ensure validity of the upgrade file during in-vehicle transmission. In addition, because the to-be-upgraded vehicle-mounted device can receive and check blocks of the upgrade file, an error can be quickly located. Moreover, computation complexity is relatively low for MAC check. Therefore, it can be ensured that check and upgrade are relatively easy for a to-be-upgraded vehicle-mounted device having a relatively weak upgrade capability in the vehicle. In this way, efficiency and security of vehicle upgrade are ensured.

In a possible implementation, the vehicle-mounted control device is specifically configured to:

encrypt each of the plurality of upgrade subfiles by using a third key, and generate, by using the preset algorithm, the plurality of mutually associated data blocks from the plurality of upgrade subfiles that are encrypted by using the third key; and the to-be-upgraded vehicle-mounted device is specifically configured to: when all the plurality of data blocks are verified, decrypt each of the plurality of sequentially verified data blocks by using the third key, and combine the plurality of data blocks that are decrypted by using the third key for upgrade.

In other words, for the vehicle-mounted control device of the intelligent vehicle in this embodiment of the present invention, confidentiality of the upgrade file is further ensured through encryption during transmission of the upgrade file in the vehicle.

In a possible implementation, the target upgrade file includes a plurality of upgrade subfiles, a plurality of mutually associated data blocks are generated from the plurality of upgrade subfiles by using a preset algorithm, and the plurality of upgrade subfiles carry a second digital signature of the plurality of data blocks that is generated by using a fourth key, where the fourth key is an asymmetric key;

the vehicle-mounted control device is specifically configured to: check the second digital signature of the plurality of data blocks, generate a second MAC of the plurality of data blocks by using a fifth key, and sequentially send, to the target to-be-upgraded vehicle-mounted device, the plurality of data blocks that carry the second MAC, where the fifth key is a symmetric algorithm key; and the to-be-upgraded vehicle-mounted device is specifically configured to: sequentially receive the plurality of data blocks that carry the second MAC and that are sent by the vehicle-mounted control device; sequentially perform verification on the plurality of data blocks based on the preset algorithm by using the fifth key; and when all the plurality of data blocks are verified, combine the plurality of sequentially verified data blocks for upgrade.

In other words, after verifying validity of the divided and signed upgrade file obtained from outside of the vehicle, the vehicle-mounted control device of the intelligent vehicle in this embodiment of the present invention divides the upgrade file into blocks and performs MAC processing inside the vehicle, to ensure validity of the upgrade file during in-vehicle transmission. In addition, because the to-be-upgraded vehicle-mounted device can receive and check blocks of the upgrade file, an error can be quickly located. Moreover, computation complexity is relatively low for MAC check. Therefore, it can be ensured that check and upgrade are relatively easy for a to-be-upgraded vehicle-mounted device having a relatively weak upgrade capability in the vehicle. In this way, efficiency and security of vehicle upgrade are ensured.

According to a third aspect, an embodiment of the present invention provides a vehicle-mounted device upgrade method, which may include:

receiving, by a target to-be-upgraded vehicle-mounted device, a target upgrade file sent by a vehicle-mounted control device, where the target upgrade file is an upgrade file on which security verification performed by the vehicle-mounted control device succeeds and that is used to upgrade at least the target to-be-upgraded vehicle-mounted device; and performing, by the target to-be-upgraded vehicle-mounted device, secure upgrade by using the target upgrade file. In this embodiment of the present invention, the target to-be-upgraded vehicle-mounted device receives an upgrade file on which security verification processing is already performed on a vehicle-mounted control device side, and performs device upgrade by using the upgrade file, to prevent to-be-upgraded vehicle-mounted devices having different upgrade capabilities from participating in a security verification process, thereby ensuring that a to-be-upgraded vehicle-mounted device is securely and efficiently upgraded by using the vehicle-mounted upgrade package.

In a possible implementation, the performing, by the target to-be-upgraded vehicle-mounted device, secure upgrade by using the target upgrade file includes: using, by the target to-be-upgraded vehicle-mounted device, an A/B system updates upgrade mode, and performing secure upgrade by using the target upgrade file, where the to-be-upgraded vehicle-mounted device is a first to-be-upgraded vehicle-mounted device whose resource storage capability and/or processing capability exceed/exceeds a preset value or a first to-be-upgraded vehicle-mounted device that is specified in advance. For a to-be-upgraded vehicle-mounted device having a relatively strong capability, the A/B system updates upgrade mode may be used for upgrade.

In a possible implementation, the target upgrade file includes a plurality of upgrade subfiles; the receiving, by a target to-be-upgraded vehicle-mounted device, a target upgrade file sent by a vehicle-mounted control device includes: sequentially receiving, by the target to-be-upgraded vehicle-mounted device, a plurality of data blocks that carry a first MAC and that are sent by the vehicle-mounted control device, where the plurality of data blocks are a plurality of mutually associated data blocks that are generated from the plurality of upgrade subfiles by using a preset algorithm, the first MAC is a message authentication code of the plurality of data blocks that is generated by using a second key, and the second key is a symmetric key; and the performing, by the target to-be-upgraded vehicle-mounted device, secure upgrade by using the target upgrade file includes: sequentially performing, by the target to-be-upgraded vehicle-mounted device, verification on the plurality of data blocks based on the preset algorithm by using the second key; and when all the plurality of data blocks are verified, combining, by the target to-be-upgraded vehicle-mounted device, the plurality of data blocks that are sequentially verified for upgrade. In other words, during transmission of the vehicle-mounted upgrade package between vehicle-mounted devices, an upgrade file is divided into a plurality of associated data blocks by using a preset algorithm, and MAC processing is performed on the associated data blocks, so that the vehicle-mounted control device divides a complete upgrade file into a plurality of data blocks that can be separately transmitted and on which validity verification can be separately performed. In addition, because the plurality of data blocks are associated, a data block that has a security problem can be quickly located by using a related algorithm. Therefore, computation workload and computation complexity in a unit time decrease for a to-be-upgraded vehicle-mounted device having a relatively weak capability. After an upgrade file transmission error occurs, an error part can be found as quickly as possible, so that only the error part rather than the entire upgrade file is requested to be retransmitted. In this way, secure and efficient upgrade for the vehicle-mounted device is further ensured.

In a possible implementation, the plurality of upgrade subfiles are encrypted by using a third key; and when all the plurality of data blocks are verified, the combining, by the target to-be-upgraded vehicle-mounted device, the plurality of data blocks that are sequentially verified for upgrade includes: when all the plurality of data blocks are verified, decrypting, by the target to-be-upgraded vehicle-mounted device, each of the plurality of sequentially verified data blocks by using the third key, and combining the plurality of data blocks that are decrypted by using the third key for upgrade. Confidentiality of the vehicle-mounted upgrade package is further ensured while validity of the vehicle-mounted upgrade package is ensured, thereby preventing the vehicle-mounted upgrade package from being obtained by an unauthorized party.

In a possible implementation, the target upgrade file includes a plurality of upgrade subfiles; the receiving, by a target to-be-upgraded vehicle-mounted device, a target upgrade file sent by a vehicle-mounted control device includes: sequentially receiving, by the target to-be-upgraded vehicle-mounted device, a plurality of data blocks that carry a second MAC and that are sent by the vehicle-mounted control device, where the plurality of data blocks are a plurality of mutually associated data blocks that are generated from the plurality of upgrade subfiles by using a preset algorithm, the second MAC is a message authentication code of the plurality of data blocks that is generated by using a fifth key, and the fifth key is a symmetric key; and the performing, by the target to-be-upgraded vehicle-mounted device, secure upgrade by using the target upgrade file includes: sequentially performing, by the target to-be-upgraded vehicle-mounted device, verification on the plurality of data blocks based on the preset algorithm by using the fifth key; and when all the plurality of data blocks are verified, combining, by the target to-be-upgraded vehicle-mounted device, the plurality of data blocks that are sequentially verified for upgrade. In other words, block transmission and signing of the vehicle-mounted upgrade package may be implemented on an upgrade developer side. That is, before obtained by the vehicle-mounted control device, data blocks are obtained through division by using a preset algorithm and signed. In this case, the vehicle-mounted device needs to first check validity of the data blocks, and then performs MAC processing on data blocks checked as valid. In this way, computation workload and computation complexity of the to-be-upgraded vehicle-mounted device decrease while validity of the vehicle-mounted upgrade file in an in-vehicle transmission process is ensured. Therefore, the vehicle-mounted device is securely and efficiently upgraded.

In a possible implementation, the method further includes: re-obtaining, by the target to-be-upgraded vehicle-mounted device, a target data block from the vehicle-mounted control device, where the target data block is a data block on which verification fails on the target to-be-upgraded vehicle-mounted device in the plurality of data blocks. Based on transmission of associated blocks, a data block on which verification fails can be quickly located, and when such a transmission error occurs, only a corresponding data block rather than the entire upgrade file needs to be requested again, thereby reducing overheads, improving upgrade efficiency, and ensuring upgrade security.

According to a fourth aspect, this application provides a vehicle-mounted device upgrade apparatus. The vehicle-mounted device upgrade apparatus has a function of implementing the method in any one of the foregoing vehicle-mounted device upgrade method embodiments. The function may be implemented by using hardware or by executing corresponding software by hardware. The hardware or software includes one or more modules corresponding to the function.

According to a fifth aspect, this application provides a to-be-upgraded vehicle-mounted apparatus. The apparatus has a function of implementing the method in any one of the foregoing vehicle-mounted device upgrade method embodiments. The function may be implemented by using hardware or by executing corresponding software by hardware. The hardware or software includes one or more modules corresponding to the function.

According to a sixth aspect, this application provides a vehicle-mounted control device. The vehicle-mounted control device includes a processor, and the processor is configured to support the vehicle-mounted control device in performing a corresponding function in the vehicle-mounted device upgrade method provided in the first aspect. The vehicle-mounted control device may further include a memory, and the memory is configured to be coupled to the processor and store a program instruction and data that are necessary for the vehicle-mounted control device. The vehicle-mounted control device may further include a communications interface for communication between the vehicle-mounted control device and another device or communications network.

According to a seventh aspect, this application provides a target to-be-upgraded vehicle-mounted device. The target to-be-upgraded vehicle-mounted device includes a processor, and the processor is configured to support the target to-be-upgraded vehicle-mounted device in performing a corresponding function in the vehicle-mounted device upgrade method provided in the third aspect. The target to-be-upgraded vehicle-mounted device may further include a memory, and the memory is configured to be coupled to the processor and store a program instruction and data that are necessary for the target to-be-upgraded vehicle-mounted device. The target to-be-upgraded vehicle-mounted device may further include a communications interface for communication between the target to-be-upgraded vehicle-mounted device and another device or communications network.

According to an eighth aspect, this application provides a computer storage medium, configured to store a computer software instruction used by the vehicle-mounted control device provided in the sixth aspect. The computer software instruction includes a program designed for implementing the foregoing aspect.

According to a ninth aspect, this application provides a computer storage medium, configured to store a computer software instruction used by the target to-be-upgraded vehicle-mounted device provided in the seventh aspect. The computer software instruction includes a program designed for implementing the foregoing aspect.

According to a tenth aspect, an embodiment of the present invention provides a computer program. The computer program includes an instruction, and when the computer program is executed by a computer, the computer is enabled to perform steps of the vehicle-mounted device upgrade method in any possible implementation of the first aspect.

According to an eleventh aspect, an embodiment of the present invention provides a computer program. The computer program includes an instruction, and when the computer program is executed by a computer, the computer is enabled to perform steps of the vehicle-mounted device upgrade method in any possible implementation of the third aspect.

According to a twelfth aspect, this application provides a chip system. The chip system includes a processor, configured to support a target to-be-upgraded vehicle-mounted device or a vehicle-mounted control device in implementing a function related to the foregoing aspects, for example, receiving or processing data and/or information in the foregoing methods. In a possible design, the chip system further includes a memory, and the memory is configured to store a program instruction and data that are necessary for the target to-be-upgraded vehicle-mounted device or the vehicle-mounted control device. The chip system may include a chip, or may include a chip and another discrete device.

DESCRIPTION OF EMBODIMENTS

Figure 1:
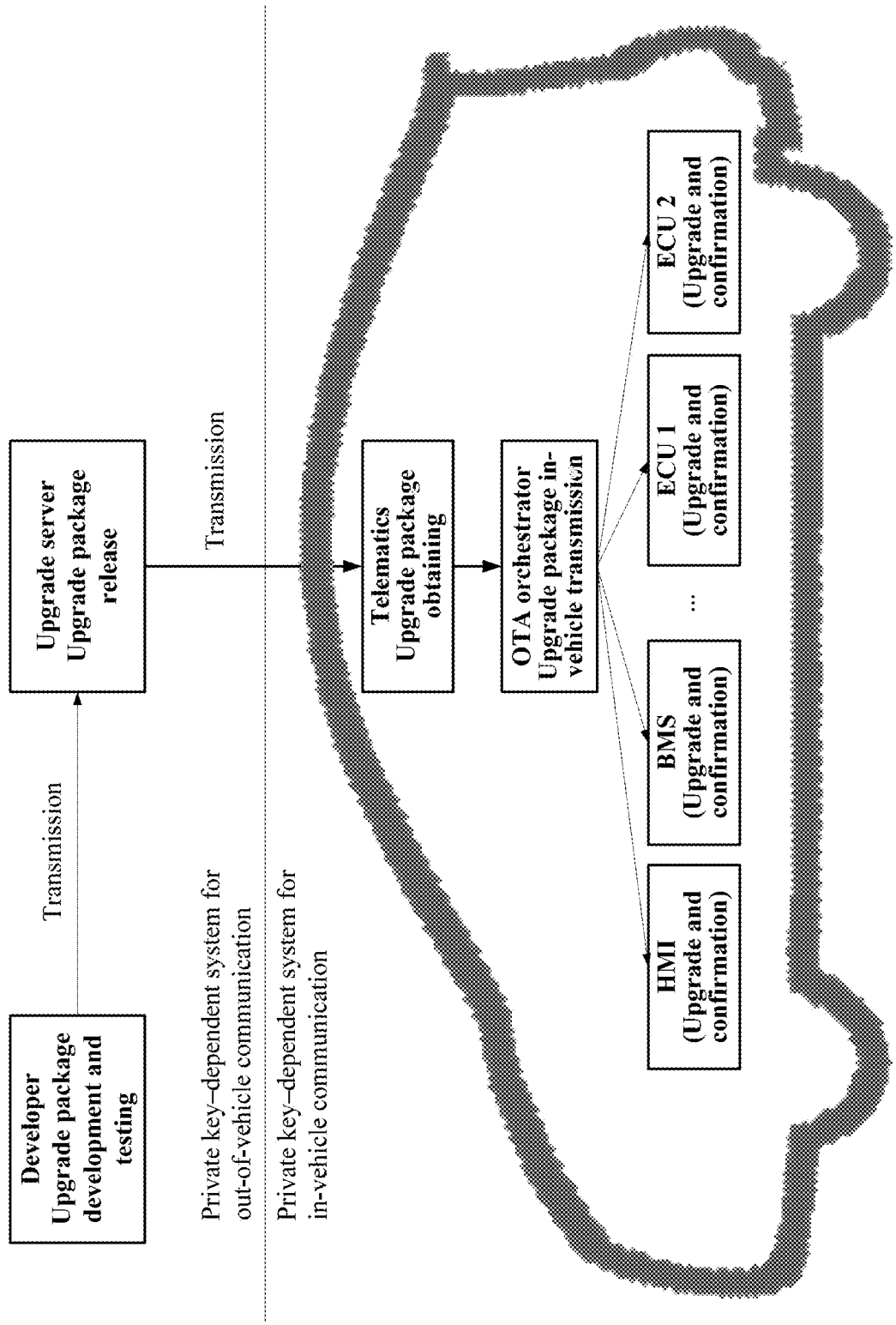
FIG. 1 is a diagram of a vehicle-mounted system upgrade architecture according to an embodiment of the present invention.

The following describes embodiments of the present invention with reference to the accompanying drawings in the embodiments of the present invention.

In this specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that any embodiment described in this specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that is run on a computing device may be components. One or more components may reside within a process and/or a thread of execution, and a component may be located on one computer and/or distributed between at least two computers. In addition, these components may be executed from various computer-readable media that store various data structures. For example, the components may communicate by using a local and/or remote process based on, for example, a signal having one or more data packets (for example, data from two components interacting with another component in a local system, a distributed system, and/or across a network such as the internet interacting with other systems by using the signal).

First, some terms in this application are described, to facilitate understanding for a person skilled in the art.

(1). An over-the-air technology (OTA) is a technology for performing remote firmware or software upgrade through an air interface in mobile communication.

(2). A vehicle-mounted information service (Telematics) is a compound of telecommunications and informatics, and may be literally defined as a service system that provides information by using a computer system built in a vehicle such as an automobile, an aircraft, a vessel, or a train, wireless communications technologies, a satellite navigation apparatus, or internet technologies for exchanging information such as a text or voice. In brief, the service system connects a vehicle to the internet by using a wireless network, and provides a vehicle owner with various information necessary for driving and living.

(3). An electronic control unit (ECU) is a vehicle-specific microcontroller from a perspective of usage. Like a common computer, the electronic control unit includes large-scale integrated circuits such as a microprocessor (CPU), a memory (a ROM or a RAM), an input/output interface (I/O), an analog-to-digital converter (A/D), a shaper, and a drive.

(4). A vehicle control unit (VCU) may also be referred to as an integrated electric vehicle controller. The VCU is a general controller of an electric vehicle powertrain, is responsible for coordinating operation of parts such as an engine, a drive motor, a gearbox, and a power battery, and has functions of improving power performance, safety performance, and economical efficiency of a vehicle. The VCU is a core part of an integrated electric vehicle control system and is a core controller configured to control start, operation, advance and retreat, speed, and stop of a motor of an electric vehicle and control another electronic device of the electric vehicle. As a core part of a control system of a pure electric vehicle, the VCU is responsible for tasks such as data exchange, safety management, driver intension interpretation, and power stream management. The VCU collects a signal of a motor control system, a signal of an accelerator pedal, a signal of a brake pedal, and a signal of another part, determines a driving intension of a driver after performing comprehensive analysis and makes a response, and monitors actions of controllers of lower-layer parts. The VCU plays a key role in functions such as normal vehicle driving, battery power braking and regeneration, network management, fault diagnosis and processing, and vehicle status monitoring.

(5). A controller area network (CAN) bus is a most widely applied field bus in the world. High reliability and a strong error detection capability of the CAN bus receive much attention, and therefore the CAN bus is widely applied to a vehicle computer control system and an industry environment with a hash ambient temperature, strong electromagnetic radiation, and intense vibration. The CAN bus is a widely applied field bus and has a great application prospect in fields such as industrial measurement and control and industrial automation. A CAN is a serial communications bus network. The CAN bus has advantages of being reliable, real-time, and flexible in data communication. For transparent design and flexible execution, a structure of the CAN bus is divided into a physical layer and a data link layer (including a logical link control LLC sub-layer and a media access control MAC sub-layer) according to an ISO/OSI standard model.

(6). A message authentication code (MAC) is a coding function for a signal source. The MAC is similar to a digest algorithm but needs to use a key during computation, and therefore the MAC depends on both a used key and information whose MAC needs to be computed. Actually, the MAC is usually obtained through construction based on the digest algorithm.

(7). A key derivation algorithm (KDF) is a key derivation function used during encryption and decryption. A function of the key derivation function is deriving key data from a shared secret bit serial port. During key negotiation, the key derivation function works on a secret bit string obtained in key exchange, to generate a required session key or key data required for further encryption.

(8). Public key cryptology (asymmetric cryptology): The public key cryptology is also referred to as asymmetric cryptology. An asymmetric key algorithm means that an encryption key of an encryption algorithm is different from a decryption key of the encryption algorithm, or one key of the encryption algorithm cannot be deduced by using the other key. A user having public key cryptology has an encryption key and a decryption key, and the decryption key cannot be obtained by using the encryption key. In addition, the encryption key is public. The public key cryptology is designed based on this principle, to use assistance information (trapdoor information) as a secret key. Security of this type of cryptology depends on computation complexity of a problem on which the type of cryptology is based. Currently, common public key cryptology includes RSA public key cryptology, ElGamal public key cryptology, and elliptic curve cryptology.

(9). Symmetric cryptology: Symmetric key encryption is also referred to as dedicated key encryption. To be specific, a data sender and a data receiver necessarily use a same key to perform encryption and decryption operations on a plaintext. That is, an encryption key can be deduced from a decryption key, and vice versa. In most symmetric algorithms, an encryption key is the same as a decryption key. These algorithms are also referred to as a secret key algorithm or a single key algorithm, and require a sender and a receiver to agree on a key before secure communication. Security of the symmetric algorithms depends on the key, and leakage of the key means that anyone can encrypt and decrypt a message. The key needs to be kept secret provided that communication requires confidentiality.

From the foregoing descriptions about the symmetric key algorithm and the asymmetric key algorithm, the following can be learned: A same key is used for both symmetric key encryption and symmetric key decryption, or it is easy to deduce a decryption key from an encryption key. In addition, the symmetric key algorithm has characteristics such as easy encryption processing, fast encryption and decryption, a relatively short key, and a long development history, and the asymmetric key algorithm has characteristics such as slow encryption and decryption, a long key, and a short development history.

(10). The transport layer security (TLS) protocol is used to provide confidentiality and data integrity between two application programs. The protocol includes two layers: the TLS record protocol and the TLS handshake protocol. The TLS protocol is used to ensure confidentiality and data integrity between two communications application programs.

First, a technical problem that needs to be resolved in this application and an application scenario are provided. In the prior art, a conventional vehicle-mounted device is recalled for firmware/software upgrade. To be specific, a vehicle is recalled to a specified location such as an automotive repair shop or a 4S store, to upgrade firmware/software by using the following methods whose specific implementations are the following solution 1 and solution 2.

Solution 1: By using a joint test action group (JTAG) interface or a Background Debug Mode (BDM) interface, perform on-line writing or perform writing after a vehicle-mounted device is disassembled. Specifically, a manner 1 and a manner 2 may be included.

Manner 1: First download to-be-upgraded software to a programmer by using a personal computer (PC), connect the programmer to a programming device, place a printed circuit board (PCB) of a vehicle electronic control system in the programming device and align the printed circuit board with a download interface, and finally power on the programmer and write the software.

Manner 2: Connect program download data lines of a PC and a single-chip microcomputer to a PCB of a vehicle electronic control system in series, and operate the PC to directly download a program to the single-chip microcomputer.

The foregoing manner 1 and manner 2 have problems of requiring a skilled person, higher costs, and quite inconvenient operation.

Solution 2: Perform flash write based on an on-board diagnostics (OBD) of a CAN bus.

Step 1. Enter a refresh mode from a normal application program running state of a vehicle electronic system (trigger interruption or diagnosis).

Step 2. Check a memory of a vehicle electronic controller chip, and determine whether a correct application program is stored in the memory.

Step 3. If there are no correct application programs in the memory, download application program software from a diagnostic device, transmit the application program software through the CAN bus, and refresh an application program in a flash (a refresh module is configured to start and guide software writing).

The solution 2 has problems of requiring a skilled person and a long cycle.

In addition to the foregoing solution 1 and solution 2, currently, remote upgrade is implemented for some vehicles. However, the remote upgrade is generally implemented mainly for a vehicle-mounted device that has a relatively strong computation capability and relatively large storage space. In other words, currently, a secure and efficient firmware/software upgrade method cannot be provided for a vehicle-mounted device that has a relatively weak computation capability or relatively small storage space. Therefore, how to implement secure and efficient firmware/software upgrade for to-be-upgraded vehicle-mounted devices having different upgrade capabilities in a vehicle-mounted system is a technical problem that actually needs to be resolved in this application.

For ease of understanding the embodiments of the present invention, based on the foregoing descriptions, the following first describes a vehicle-mounted upgrade system architecture applied to the embodiments of the present invention. FIG. 1 is a diagram of a vehicle-mounted system upgrade architecture (an architecture 1 for short) according to an embodiment of the present invention. A vehicle-mounted device upgrade method provided in this application may be applied to the system architecture. The system architecture includes an upgrade server, a vehicle-mounted control device, and a plurality of to-be-upgraded vehicle-mounted devices such as an HMI (human-machine interface), a BMS (battery management system), an ECU 1, and an ECU 2. The vehicle-mounted control device may include a telematics unit and an OTA orchestrator unit that are configured to manage and assist in an upgrade process of the plurality of to-be-upgraded vehicle-mounted devices. In the system architecture, remote upgrade for a vehicle-mounted device may include the following basic processes: upgrade package release, upgrade package obtaining, upgrade package in-vehicle transmission, and upgrade and confirmation.

The upgrade server is configured to obtain an unencrypted vehicle-mounted upgrade package from a developer.

The telematics in the vehicle-mounted control device is responsible for communication with outside. In this application, the telematics is responsible for communicating with the upgrade server and a key server, to implement a task of obtaining the vehicle-mounted upgrade package and perform some actions of transmitting the vehicle-mounted upgrade package (send the vehicle-mounted upgrade package to the OTA orchestrator).

Figure 2:
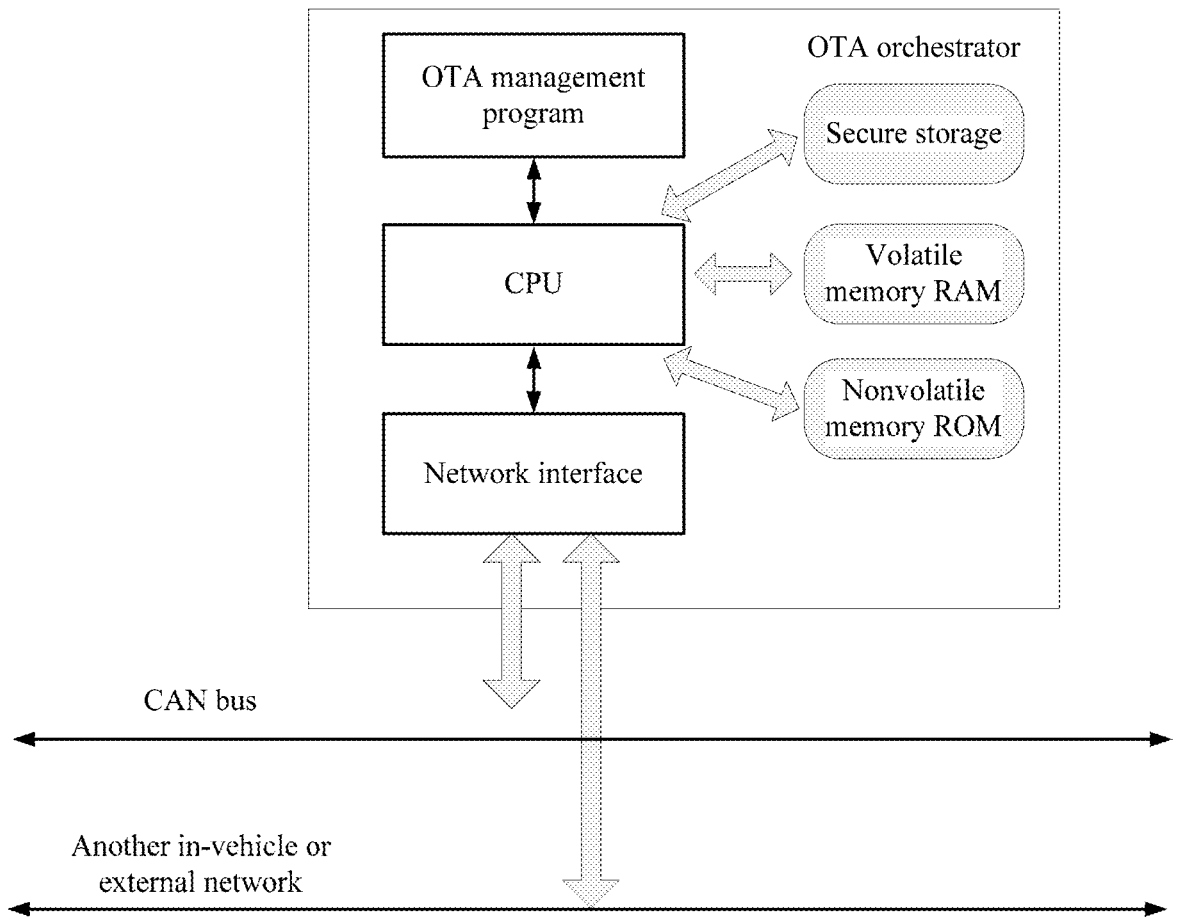
FIG. 2 is a schematic structural diagram of an OTA orchestrator according to an embodiment of the present invention.

The OTA orchestrator in the vehicle-mounted control device is responsible for communication with the to-be-upgraded vehicle-mounted devices in the vehicle. In this application, the vehicle-mounted upgrade package passes through the telematics and a management unit/module, and finally arrives at a target to-be-upgraded vehicle-mounted device. A main function of the OTA orchestrator is managing and assisting in an upgrade process of the vehicle-mounted devices. Specifically, the OTA orchestrator needs to have the following functions: key delivery and management; OTA process management; assisting another to-be-upgraded vehicle-mounted device having a weaker capability in an operation requiring large computation workload, for example, verifying integrity and authenticity of an upgrade package, or transcoding; and serving as a back-up node of another to-be-upgraded vehicle-mounted device having a weaker capability, for rollback when upgrade fails. The OTA orchestrator is a logical entity and can be physically deployed on any powerful unit or module such as the telematics, a gateway, or a VCU. A structure of the OTA orchestrator may be shown in FIG. 2. FIG. 2 is a schematic structural diagram of an OTA orchestrator according to an embodiment of the present invention. The OTA orchestrator may include a processor CPU, a related volatile memory RAM, a related non-volatile memory ROM, and a secure storage configured to store a key, for example, a static key that is shared with a vehicle-mounted device. The OTA orchestrator further includes a memory configured to store an OTA management program, and the OTA management program is used to manage an upgrade process; and further includes a network interface that can communicate with another vehicle-mounted device through a CAN bus or another in-vehicle network. It can be understood that, if the OTA orchestrator is implemented on the telematics, the OTA orchestrator further requires a network interface to communicate with an external network. That is, the OTA orchestrator needs to have a relatively strong computation capability and a relatively large quantity of resources, to assist a vehicle-mounted device in completing remote upgrade and to be trusted by another vehicle-mounted device. In terms of logical architecture division, the OTA orchestrator divides the architecture into an out-of-vehicle communication part and an in-vehicle communication part. Devices of the in-vehicle part need to perform only a symmetric cryptology operation, rather than a public key cryptology operation. If a public key cryptology operation needs to be performed, the public key cryptology operation is assigned to the OTA orchestrator, to reduce computation workload and computation complexity of a to-be-upgraded device in the vehicle.

Figure 3:
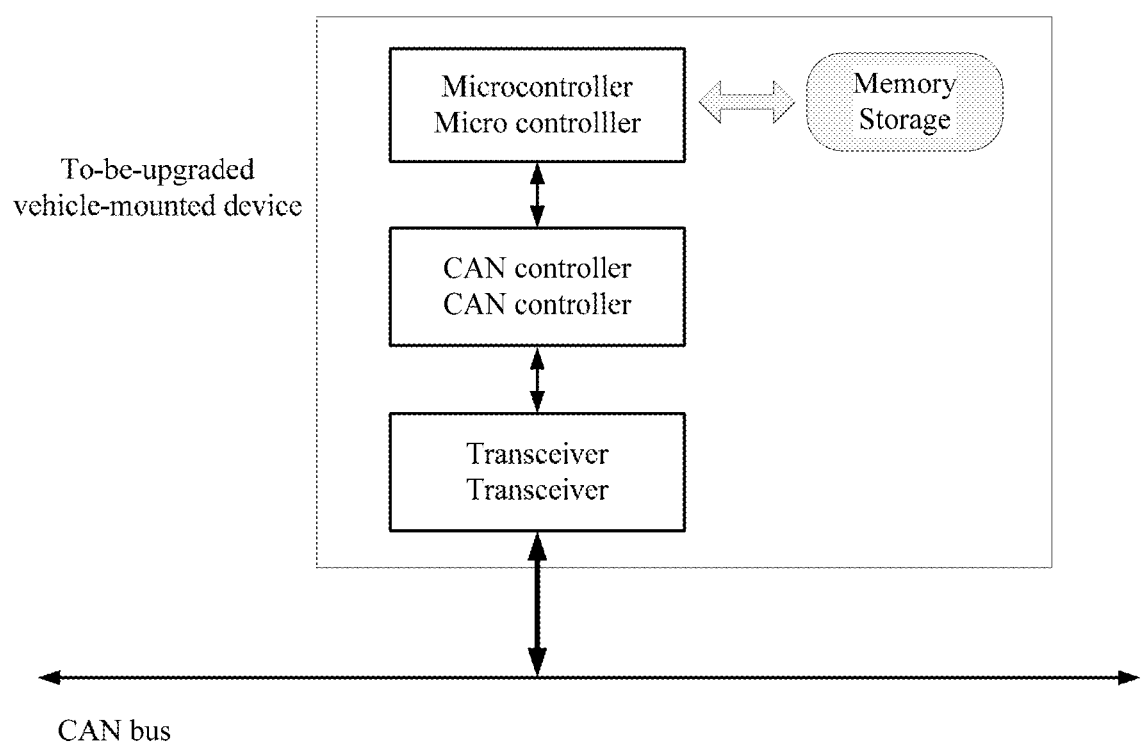
FIG. 3 is a schematic structural diagram of a to-be-upgraded vehicle-mounted device according to an embodiment of the present invention.

For the to-be-upgraded vehicle-mounted devices, a composition of any one of the to-be-upgraded vehicle-mounted devices may be shown in FIG. 3. FIG. 3 is a schematic structural diagram of a to-be-upgraded vehicle-mounted device according to an embodiment of the present invention. The to-be-upgraded vehicle-mounted device may include a microcontroller, a CAN controller, and a transceiver. The to-be-upgraded vehicle-mounted device communicates with an in-vehicle network such as a CAN bus by using the transceiver. The CAN controller is configured to implement the CAN protocol, and the microcontroller is configured to implement related computation processing before and after upgrade. For example, the microcontroller may implement a vehicle-mounted device upgrade method performed by the to-be-upgraded vehicle-mounted device in this application. With reference to the foregoing schematic structural diagram, in this application, a target to-be-upgraded vehicle-mounted device receives, based on the in-vehicle network such as the CAN bus by using a transceiver, a target upgrade file sent by the vehicle-mounted control device, and performs secure upgrade by using the target upgrade file and the microcontroller. For a more specific function, refer to descriptions about a function related to the to-be-upgraded vehicle-mounted device in subsequent embodiments.

It can be learned from the schematic structural diagram of the to-be-upgraded vehicle-mounted device that, the CAN bus is commonly used in current vehicles, but the CAN bus affects bandwidth. Consequently, in some upgrade scenarios, maximum upgrade efficiency cannot be achieved for remote upgrade of firmware/software for a vehicle-mounted device.

Figure 4:
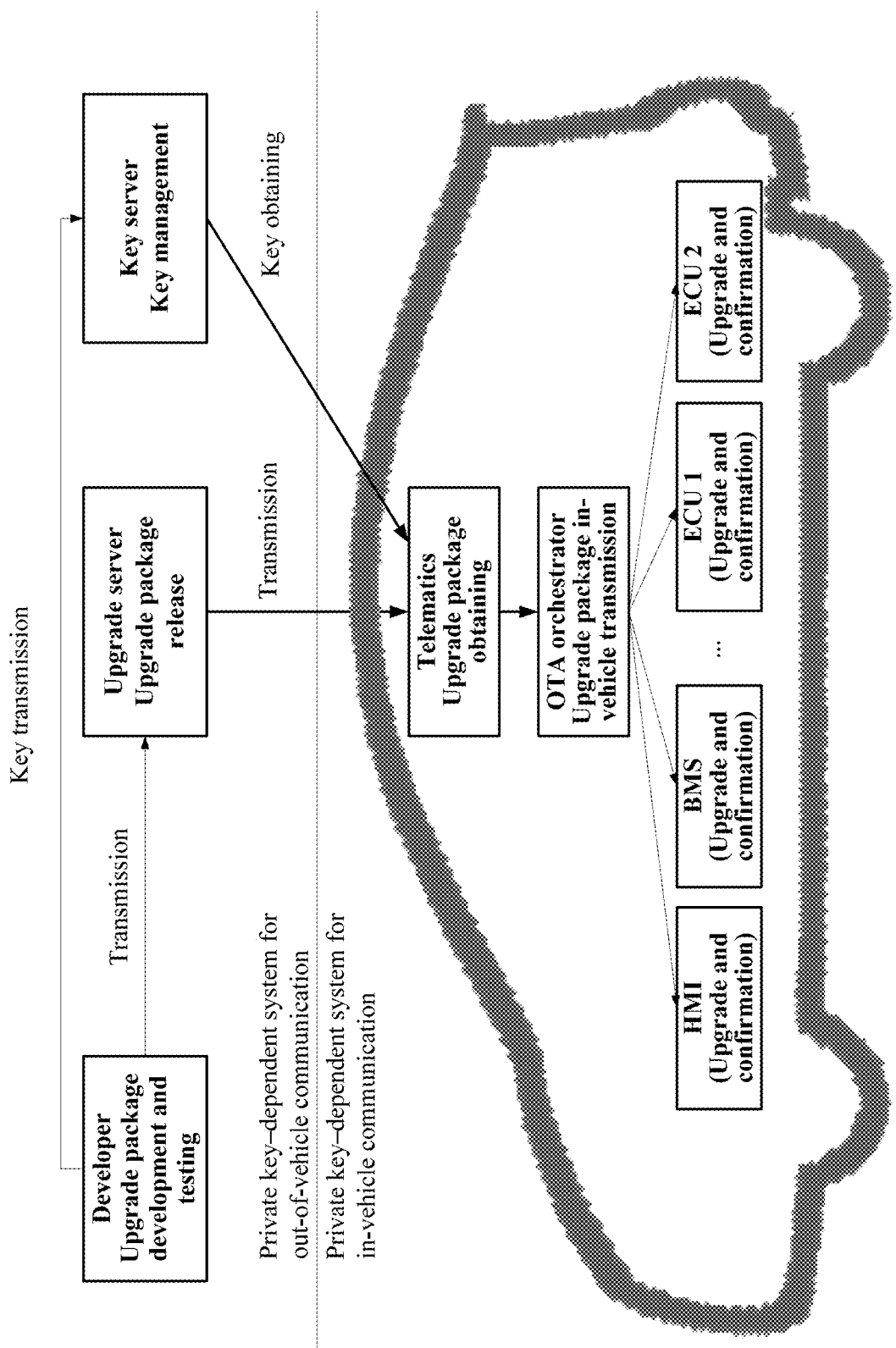
FIG. 4 is a diagram of another vehicle-mounted system upgrade architecture according to an embodiment of the present invention.

FIG. 4 is a diagram of another vehicle-mounted system upgrade architecture (an architecture 2 for short) according to an embodiment of the present invention. Different from the system upgrade architecture provided in FIG. 1, this vehicle-mounted system upgrade architecture further includes a key server.

An upgrade server is configured to obtain, from a developer, a vehicle-mounted upgrade package encrypted by the developer.

The key server is configured to: when the vehicle-mounted upgrade package is encrypted by the developer, obtain a key from the developer through a secure channel, store the key, and finally provide the key to a vehicle-mounted control device.

It can be understood that, for other aspects such as specific functions of the vehicle-mounted control device and a plurality of to-be-upgraded vehicle-mounted devices, refer to descriptions about function entities or units in the vehicle-mounted system upgrade architecture corresponding to FIG. 1. Details are not described herein again.

It can be further understood that, the vehicle-mounted system upgrade architecture in this application may further include the developer. After developing and testing an upgrade program (firmware/software), the developer delivers the vehicle-mounted upgrade package to the upgrade server. The delivered vehicle-mounted upgrade package needs to be signed by using a digital signature. Optionally, before being signed by using the digital signature, the vehicle-mounted upgrade package may be further encrypted. If the vehicle-mounted upgrade package is not encrypted, the architecture is the system architecture in FIG. 1; if the vehicle-mounted upgrade package is encrypted, the architecture is the system architecture in FIG. 2. Corresponding embodiments are to be detailed in the following descriptions.

It should be noted that, the vehicle-mounted system upgrade architectures in FIG. 1 and FIG. 4 are merely two examples of implementations of the embodiments of the present invention. A communications system architecture in the embodiments of the present invention includes but is not limited to the foregoing system architectures.

The following specifically analyzes and resolves the technical problem provided in this application by using embodiments of the vehicle-mounted device upgrade method provided in this application.

Figure 5:
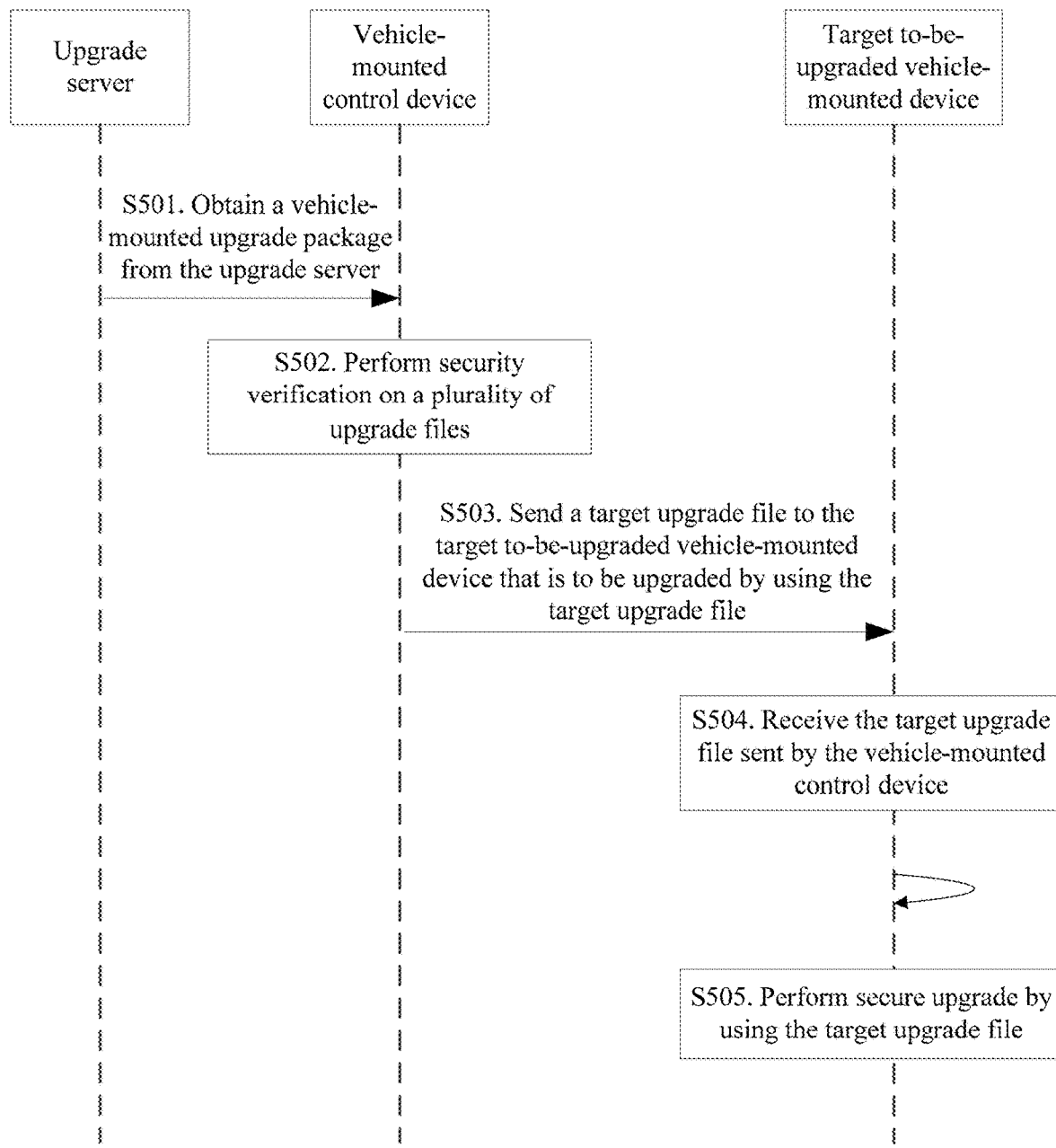
FIG. 5 is a schematic flowchart of a vehicle-mounted device upgrade method according to an embodiment of the present invention.

FIG. 5 is a schematic flowchart of a vehicle-mounted device upgrade method according to an embodiment of the present invention. The method may be applied to the vehicle-mounted system upgrade architecture in FIG. 1 or FIG. 4. With reference to FIG. 5, the following describes the method from a perspective of interaction between a vehicle-mounted control device and a target to-be-upgraded vehicle-mounted device. The method may include steps S501 to S505.

Step S501. The vehicle-mounted control device obtains a vehicle-mounted upgrade package.

Step S502. The vehicle-mounted control device performs security verification on a plurality of upgrade files.

Step S503. The vehicle-mounted control device sends a target upgrade file to the target to-be-upgraded vehicle-mounted device that is to be upgraded by using the target upgrade file, where the target upgrade file is an upgrade file on which security verification succeeds in the plurality of upgrade files.

Step S504. The target to-be-upgraded vehicle-mounted device receives the target upgrade file sent by the vehicle-mounted control device, where the target upgrade file is an upgrade file on which security verification performed by the vehicle-mounted control device succeeds and that is used to upgrade the to-be-upgraded vehicle-mounted device.

Step S505. The target to-be-upgraded vehicle-mounted device performs secure upgrade by using the target upgrade file.

Specifically, the vehicle-mounted upgrade package includes the plurality of upgrade files, and each upgrade file is used to upgrade at least one to-be-upgraded vehicle-mounted device. In other words, one to-be-upgraded vehicle-mounted device in a vehicle-mounted system may correspond to one or more upgrade files.

Figure 6:
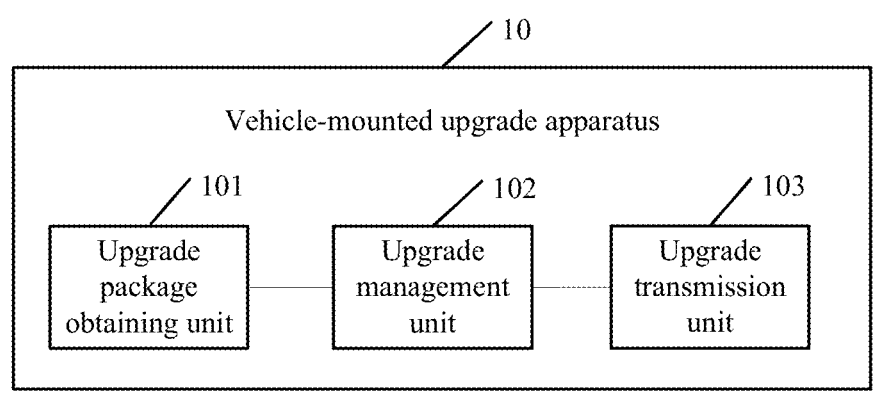
FIG. 6 is a schematic structural diagram of a vehicle-mounted upgrade apparatus according to an embodiment of the present invention.

Before the vehicle-mounted control device performs step S501, the vehicle-mounted upgrade package is released. Generally, after developing and testing an upgrade program, a developer of the vehicle-mounted upgrade package (firmware/software) delivers the vehicle-mounted upgrade package to an upgrade server. In a possible implementation, the vehicle-mounted upgrade package includes a first digital signature. It is assumed that the vehicle-mounted upgrade package is M and version information is ver (for example, all metadata (meta-data) information such as a program name, a new version number, and an old version number). In this embodiment of the present invention, the following two digital signing manners may be provided during release of the vehicle-mounted upgrade package: the developer digitally signs the upgrade package, or the upgrade server digitally signs the upgrade package, as shown in FIG. 6. FIG. 6 is a schematic diagram of two types of digital signatures according to an embodiment of the present invention. A case 1 and a case 2 are included.

Case 1: $\sigma=Sign_D(M\|ver)$ indicates that the developer digitally signs M∥ver, and serves as the first digital signature in this application.

Case 2: $\sigma=Sign_S(M\|ver)$ indicates that the upgrade server digitally signs M∥ver, and serves as the first digital signature in this application.

A digital signature algorithm used in the foregoing two signing manners is not specifically limited in this application. Optionally, a secure channel may be established between the developer and the upgrade server to transfer information, and the secure channel may be a network channel or may be a physical channel such as a registered letter. In conclusion, when the vehicle-mounted upgrade package is released, the upgrade server updates the vehicle-mounted upgrade package [M, ver, σ], and externally releases information about an updated or new vehicle-mounted upgrade package.

This application provides two vehicle-mounted system upgrade architectures: the architecture 1 without a key server shown in FIG. 1, and an architecture 2 including a key server shown in FIG. 4.

In the architecture 1, the vehicle-mounted upgrade package is not encrypted. The upgrade server needs to perform authentication on identity information of the vehicle-mounted control device, establish a secure channel to the vehicle-mounted control device after authentication succeeds, and obtain the vehicle-mounted upgrade package through the secure channel. The process is a process in which an OTA orchestrator in the vehicle-mounted control device obtains an upgrade package from the upgrade server by using a telematics unit.

Specifically, the vehicle-mounted control device sends identity authentication information to the upgrade server. If the identity authentication information is authenticated by the upgrade server, the secure channel is established between the vehicle-mounted control device and the upgrade server; and the vehicle-mounted control device obtains, from the upgrade server through the secure channel, the vehicle-mounted upgrade package that is required for upgrade.

In a specific implementation, the OTA orchestrator queries the upgrade server, or the upgrade server pushes an update message to the OTA orchestrator. The upgrade package may be specifically obtained in the following steps.

1. The OTA orchestrator OTA orchestrator obtains current version information of the target to-be-upgraded vehicle-mounted device. The information may be obtained by querying the target to-be-upgraded vehicle-mounted device or by querying a database maintained by the OTA orchestrator (it is assumed that the OTA orchestrator maintains basic information of firmware/software of all vehicle-mounted devices).

2. The OTA orchestrator determines whether upgrade is required. If upgrade is required, the OTA orchestrator may choose to prompt a vehicle owner whether to perform upgrade. If the vehicle owner agrees, upgrade proceeds.

3. The OTA orchestrator initiates authentication to the upgrade server, establishes a secure channel to the upgrade server, and transmits a data packet through the secure channel.

4. The OTA orchestrator reports the current version information of the vehicle-mounted device to the upgrade server, and if the upgrade server agrees, the OTA orchestrator downloads an upgrade package [M, ver, σ, {M'}]. M is the vehicle-mounted upgrade package; ver represents version information, including all metadata (meta-data) information such as a program name, a new version number, and a corresponding old version number; $\sigma=\text{Sign}_D(M\|\text{ver})$ or $\sigma=\text{Sign}_S(M\|\text{ver})$ is the first digital signature, and M' represents a rollback file; and {M'} indicates that M' is optional and is effective only when the target to-be-upgraded vehicle-mounted device is a weak-capability device.

5. The OTA orchestrator performs verification on authenticity of the first digital signature σ, and if verification fails, the OTA orchestrator gives up upgrade. Optionally, if necessary, the OTA orchestrator also performs verification on M'. It is assumed that M' also carries a digital signature.

In the architecture 2, the vehicle-mounted upgrade package is encrypted in the upgrade server. Therefore, a dedicated secure channel may not need to be established between the vehicle-mounted control device and the upgrade server. In addition, after the vehicle-mounted control device performs verification on the vehicle-mounted upgrade package by using the first signature, the vehicle-mounted upgrade package further needs to be decrypted by using a first key. In this embodiment, the upgrade files are encrypted by the developer. An additional benefit of encrypting the upgrade files by the developer is that the developer does not need to consider credibility of the upgrade server. Therefore, confidentiality of the upgrade files is further protected.

Specifically, the vehicle-mounted upgrade package is encrypted by using the first key. The first key is a symmetric key. The vehicle-mounted control device obtains the first key from the key server. After the vehicle-mounted control device performs digital signature verification on the plurality of upgrade files by using the first digital signature, if the digital signature verification succeeds, the vehicle-mounted control device decrypts the plurality of upgrade files by using the first key.

After developing and testing an upgrade program, the developer of the vehicle-mounted upgrade package (firmware/software) delivers the upgrade files to the upgrade server. This process is corresponding to the architecture shown in FIG. 4. Different from the architecture 1, this architecture needs an additional key server.

It is assumed that the upgrade files are M and ver represents version information, including all metadata (meta-data) information such as a program name, a new version number, and a corresponding old version number. The developer selects any key K (the first key), and encrypts M by using K, so that $C=E(K, M)$ is obtained. Herein $E(K,.)$ represents K-based encryption, for example, group encryption.

As described above, for the first digital signature, there are two scenarios: the developer digitally signs the upgrade package, or the upgrade server digitally signs the upgrade package. In both cases, the developer needs to send the key K of the encrypted upgrade files to the key server through a secure channel, and the channel for transmitting the encrypted upgrade files does not require protection. A secret channel between the developer and the key server may be established by using many methods, for example, by using the TLS. This is not specifically limited in this application.

In a specific implementation, the process is a process in which the OTA orchestrator obtains an upgrade package from the upgrade server and obtains, from the key server, a key for decrypting upgrade software. Specifically, after learning that there is a new upgrade package for a vehicle-mounted device, the OTA orchestrator initiates the process. The OTA orchestrator may learn the message by querying the upgrade server or the upgrade server pushes information to the OTA orchestrator. The upgrade package may be obtained in the following steps.

1. The OTA orchestrator obtains current version information of the target to-be-upgraded vehicle-mounted device. The information may be obtained by querying the target to-be-upgraded vehicle-mounted device or by querying a database maintained by the OTA orchestrator (it is assumed that the OTA orchestrator maintains basic information of firmware/software of all vehicle-mounted devices).

2. The OTA orchestrator determines whether upgrade is required. If upgrade is required, the OTA orchestrator may choose to prompt a vehicle owner whether to perform upgrade. If the vehicle owner agrees, upgrade proceeds.

3. The OTA orchestrator downloads an upgrade package [C, ver, σ, {C'}] from the upgrade server. It should be noted that C' represents an encrypted file signed by using a digital signature and to be used for rollback when upgrade fails; and {C'} indicates that C' is optional and is effective only when the target to-be-upgraded vehicle-mounted device is a weak-capability device.

4. The OTA orchestrator performs verification on authenticity of 6 (that is, perform verification on authenticity of the first digital signature), and if verification fails, the OTA orchestrator gives up upgrade. If necessary, the OTA orchestrator also performs verification on C'.

5. The OTA orchestrator initiates authentication to the key server, establishes a secure channel to the key server, and obtains a decryption key K (that is, the first key) of the upgrade package through the secure channel. If necessary, the OTA orchestrator also needs to obtain a decryption key for decrypting C'.

6. The OTA orchestrator decrypts C by using K to obtain the upgrade files M; and if necessary, the OTA orchestrator also needs to decrypt C' to obtain M' (M' is a file used for rollback when upgrade fails).

In a possible implementation, if confidentiality of the upgrade files also needs to be protected, after obtaining the upgrade package, the OTA orchestrator does not decrypt C but divides C into n parts: $C_1, C_2, \ldots,$ and $C_n$, and then uses $C_1, C_2, \ldots,$ and $C_n$ in subsequent processing methods that are based on a hash chain, a hash tree, and a bloom filter. The OTA orchestrator also needs to transfer the shared key K to the target to-be-upgraded vehicle-mounted device through a secret channel, so that the target to-be-upgraded vehicle-mounted device performs decryption.

In step S502, the vehicle-mounted control device needs to perform security verification on the plurality of upgrade files in the vehicle-mounted upgrade package obtained from the upgrade server. In a possible implementation, the vehicle-mounted upgrade package includes the first digital signature, and the OTA orchestrator of the vehicle-mounted control device performs digital signature verification on the plurality of upgrade files by using the first digital signature. To be specific, after the vehicle-mounted control device obtains the vehicle-mounted upgrade package, different from the prior art in which an upgrade package is directly sent to a corresponding to-be-upgraded vehicle-mounted device for upgrade, security verification (for example, authenticity verification) is first performed on the plurality of upgrade files in the vehicle-mounted upgrade package on a vehicle-mounted control device side, an upgrade file on which security verification succeeds is then subject to transcoding, and a transcoded upgrade file is sent to a corresponding to-be-upgraded vehicle-mounted device for secure upgrade. It should be noted that, the transcoding in this application means that hash association processing is performed, by using an algorithm (a hash chain algorithm, a hash tree algorithm, or a bloom filter algorithm), on each of a plurality of upgrade subfiles obtained through division, and MAC processing is performed in one or more nodes in a hash chain, a hash tree, or a bloom filter, to further implement secure data package segment transmission that is applicable to an in-vehicle network. In this way, a large quantity of security verification operations that need to be performed by the to-be-upgraded vehicle-mounted device decreases. In other words, computation workload, computation complexity, and the like decrease during security verification performed by a single to-be-upgraded vehicle-mounted device.

In step S503, different to-be-upgraded vehicle-mounted devices may correspond to only some upgrade files in the vehicle-mounted upgrade package. Therefore, the vehicle-mounted control device needs to send the target upgrade file on which security verification succeeds in the plurality of upgrade files to the target to-be-upgraded vehicle-mounted device that is to be upgraded by using the target upgrade file. It can be understood that sizes and content of upgrade subfiles in the target upgrade file may be different.

In a possible implementation, the vehicle-mounted control device divides the target upgrade file into a plurality of upgrade subfiles (which may also be understood as a plurality of segments); generates a plurality of mutually associated data blocks from the plurality of upgrade subfiles by using a preset algorithm, and generates a first message authentication code MAC of the plurality of data blocks by using a second key; and sequentially sends, to the target to-be-upgraded vehicle-mounted device, the plurality of data blocks that carry the first MAC. The second key is a symmetric algorithm key.

Specifically, during transmission of the vehicle-mounted upgrade package between vehicle-mounted devices, the vehicle-mounted control device divides, by using a preset algorithm, an upgrade file into a plurality of associated data blocks, and performs MAC processing on the associated data blocks, so that the vehicle-mounted control device divides a complete upgrade file into a plurality of data blocks that can be separately transmitted and on which validity verification can be separately performed. In addition, because the plurality of data blocks are associated, a data block that has a security problem can be quickly located by using a related algorithm. The preset algorithm includes any one of the hash chain algorithm, the hash tree algorithm, and the bloom filter algorithm. In this application, the vehicle-mounted control device divides the target upgrade file into the plurality of upgrade subfiles to avoid sending the target upgrade file to the to-be-upgraded vehicle-mounted device at a time, so that the to-be-upgraded vehicle-mounted device can separately receive and process the upgrade subfiles. Therefore, "sequentially" in this application may include "one after another", or may indicate "a plurality of upgrade subfiles after another plurality of upgrade subfiles", for example, first sending two upgrade subfiles, then sending another two upgrade subfiles, and so on; or may indicate first sending one upgrade subfile, then sending another two upgrade subfiles, and so on. That is, the vehicle-mounted control device merely needs to divide the target upgrade file into a plurality of upgrade subfiles and send the upgrade subfiles to the to-be-upgraded vehicle-mounted device in batches. A specific manner of dividing the target upgrade file and sequentially sending the upgrade subfiles to the to-be-upgraded vehicle-mounted device is not specifically limited in this application. In this application, to resolve problems of a weak capability and insufficient storage resources of a vehicle-mounted device and limited in-vehicle network bandwidth, the deployed OTA orchestrator is capable of transcoding the vehicle-mounted upgrade package. With the transcoding function of the OTA orchestrator, the vehicle-mounted device does not need to perform a public key cryptology operation, thereby reducing workload of the vehicle-mounted device. Therefore, computation workload and computation complexity in a unit time decrease for a to-be-upgraded vehicle-mounted device having a relatively weak capability. In addition, after an upgrade file transmission error occurs, an error part can be found as quickly as possible, so that only the error part rather than the entire upgrade file is requested to be retransmitted. In this way, secure and efficient upgrade for the vehicle-mounted device is further ensured.

In a possible implementation, the vehicle-mounted control device divides the target upgrade file into a plurality of upgrade subfiles, encrypts (to ensure confidentiality) and transcodes (to ensure authenticity) the plurality of upgrade subfiles, and sequentially sends encrypted and transcoded upgrade subfiles to the target to-be-upgraded vehicle-mounted device. Specifically, the vehicle-mounted control device encrypts each of the plurality of upgrade subfiles by using a third key, generates, by using the preset algorithm, the plurality of mutually associated data blocks from the plurality of upgrade subfiles that are encrypted by using the third key, and sequentially sends, to the target to-be-upgraded vehicle-mounted device, the plurality of data blocks that carry the first MAC. In other words, this embodiment of the present invention differs from the foregoing embodiment of the present invention in that the vehicle-mounted control device needs to encrypt the plurality of upgrade subfiles before transcoding, to ensure confidentiality of the plurality of upgrade subfiles, and then transcodes the encrypted upgrade subfiles.

In a possible implementation, the target upgrade file includes a plurality of upgrade subfiles, a plurality of mutually associated data blocks are generated from the plurality of upgrade subfiles by using a preset algorithm, and the plurality of upgrade subfiles carry a second digital signature of the plurality of data blocks that is generated by using a fourth key, where the fourth key is an asymmetric key; the vehicle-mounted control device checks the second digital signature of the plurality of data blocks; the vehicle-mounted control device generates a second MAC of the plurality of data blocks by using a fifth key, where the fifth key is a symmetric algorithm key; and the vehicle-mounted control device sequentially sends, to the target to-be-upgraded vehicle-mounted device, the plurality of data blocks that carry the second MAC. In other words, block transmission and signing of the vehicle-mounted upgrade package may be implemented on an upgrade developer side. That is, before obtained by the vehicle-mounted control device, data blocks are obtained through division by using a preset algorithm and signed. In this case, the vehicle-mounted device needs to first check validity of the data blocks, and then performs MAC processing on data blocks checked as valid. Computation workload and computation complexity in MAC check are much less than those in a signature case. Therefore, computation workload and computation complexity of the to-be-upgraded vehicle-mounted device can decrease while validity of the vehicle-mounted upgrade file in an in-vehicle transmission process is ensured. Therefore, the vehicle-mounted device is securely and efficiently upgraded.

In step S504, the target to-be-upgraded vehicle-mounted device receives the target upgrade file sent by the vehicle-mounted control device. The target upgrade file is an upgrade file on which security verification performed by the vehicle-mounted control device succeeds and that is used to upgrade at least the target to-be-upgraded vehicle-mounted device. Specifically, this process is a process of in-vehicle secure transmission of the vehicle-mounted upgrade package.

In step S505, the target to-be-upgraded vehicle-mounted device performs secure upgrade by using the target upgrade file. In a possible implementation, when the to-be-upgraded vehicle-mounted device is a first to-be-upgraded vehicle-mounted device whose resource storage capability and/or processing capability exceed/exceeds a preset value or a first to-be-upgraded vehicle-mounted device that is specified in advance, for example, a device having a relatively strong processing capability or a relatively strong storage capability, or a specified device, an A/B system updates upgrade mode is used for the target to-be-upgraded vehicle-mounted device. To be specific, the target to-be-upgraded vehicle-mounted device has a region A and a region B, a to-be-upgraded program (firmware or software) is run in the region A and a new upgrade program is written into the region B, and the program is executed in the region B after upgrade is completed. This does not affect normal running of an old version system in a vehicle-mounted upgrade process. For example, a strong-capability device or a key device uses an A/B system updates upgrade method; a weak-capability device uses the OTA orchestrator as a back-up node, to perform rollback when upgrade fails. When upgrade succeeds, the vehicle-mounted device deletes the upgrade package and notifies the OTA orchestrator. The OTA orchestrator deletes the upgrade package, updates the database, and notifies the vehicle owner of the successful upgrade. Alternatively, the OTA orchestrator may choose to notify the upgrade server. In addition, the OTA orchestrator may further choose to instruct the target to-be-upgraded vehicle-mounted device to perform remote attestation, to attest that the upgrade succeeds.

In a possible implementation, the target to-be-upgraded vehicle-mounted device sequentially receives the plurality of data blocks that carry the first MAC and that are sent by the vehicle-mounted control device. The plurality of data blocks are a plurality of mutually associated data blocks that are generated from the plurality of upgrade subfiles by using a preset algorithm, the first MAC is a message authentication code of the plurality of data blocks that is generated by using a second key, and the second key is a symmetric key. In other words, the second key is a shared key. Therefore, only authenticity verification needs to be performed between the target to-be-upgraded device and the vehicle-mounted control device by using the simple symmetric key. This reduces computation workload and computation complexity of the target to-be-upgraded device. In this way, secure and efficient upgrade may require only relatively small computation workload and relatively low computation complexity even for a "weak" to-be-upgraded vehicle-mounted device having a relatively weak computation capability or relatively small storage space.

In a possible implementation, the target to-be-upgraded vehicle-mounted device sequentially performs verification on the plurality of data blocks based on the preset algorithm by using the second key; and when all the plurality of data blocks are verified, the target to-be-upgraded vehicle-mounted device combines the plurality of sequentially verified data blocks for upgrade. To be specific, after receiving the plurality of upgrade subfiles that are encrypted by using the second key, transcoded by using the preset algorithm, and sent by the vehicle-mounted control device, the target to-be-upgraded device needs to check the first MAC by using the second key, and performs association value check on the plurality of data blocks by using a feature of the mutually associated data blocks generated by using the preset algorithm. After all the data blocks are decoded and verified, that is, verification on all the data blocks succeeds, the target to-be-upgraded device combines the plurality of upgrade subfiles into a complete file for upgrade.

In a possible implementation, the plurality of upgrade subfiles are encrypted by using a third key; when all the plurality of data blocks are verified, the target to-be-upgraded vehicle-mounted device decrypts each of the plurality of sequentially verified data blocks by using the third key; and the target to-be-upgraded vehicle-mounted device combines the plurality of data blocks that are decrypted by using the third key for upgrade. In other words, this embodiment of the present invention differs from the foregoing embodiment of the present invention in that the target to-be-upgraded vehicle-mounted device needs to perform verification on the encrypted and transcoded upgrade subfiles before decrypting the plurality of upgrade subfiles that are verified, and combines the plurality of upgrade subfiles for upgrade after decryption succeeds.

In a possible implementation, the target upgrade file includes a plurality of upgrade subfiles; and the target to-be-upgraded vehicle-mounted device sequentially receives the plurality of data blocks that carry the second MAC and that are sent by the vehicle-mounted control device. The plurality of data blocks are a plurality of mutually associated data blocks that are generated from the plurality of upgrade subfiles by using the preset algorithm, the second MAC is a message authentication code of the plurality of data blocks that is generated by using a fifth key, and the fifth key is a symmetric algorithm. The target to-be-upgraded vehicle-mounted device sequentially performs verification on the plurality of data blocks based on the preset algorithm by using the fifth key; and when all the plurality of data blocks are verified, the target to-be-upgraded vehicle-mounted device combines the plurality of sequentially verified data blocks for upgrade. In other words, block transmission and signing of the vehicle-mounted upgrade package may be implemented on an upgrade developer side. That is, before obtained by the vehicle-mounted control device, data blocks are obtained through division by using a preset algorithm and signed. In this case, the vehicle-mounted device needs to first check validity of the data blocks, and then performs MAC processing on data blocks checked as valid. Computation workload and computation complexity in MAC check are much less than those in signature. Therefore, computation workload and computation complexity of the to-be-upgraded vehicle-mounted device can decrease while validity of the vehicle-mounted upgrade file in an in-vehicle transmission process is ensured. Therefore, the vehicle-mounted device is securely and efficiently upgraded.

Further, when the target to-be-upgraded vehicle-mounted device performs an upgrade operation, if verification on a target data block in the plurality of data blocks fails on the target to-be-upgraded vehicle-mounted device, the vehicle-mounted control device retransmits the target data block to the target to-be-upgraded vehicle-mounted device. In other words, the target to-be-upgraded vehicle-mounted device re-obtains the target data block from the vehicle-mounted control device. Combination and upgrade are performed only when all data blocks are verified. In this embodiment of the present invention, because the target upgrade file is divided into a plurality of data blocks, when verification on one or more data blocks fails, only the one or more data blocks instead of the entire target upgrade file need to be downloaded again, thereby reducing overheads and improving upgrade efficiency.

The following describes authenticity verification between the vehicle-mounted control device and the target to-be-upgraded device, that is, how the vehicle-mounted control device transcodes the target upgrade file of the vehicle-mounted upgrade package by using a preset algorithm.

In a specific implementation, after verifying authenticity of the vehicle-mounted upgrade package, the OTA orchestrator starts the process at an appropriate time, for example, in a parked state, or the OTA orchestrator may choose to ask for the vehicle owner to confirm upgrade again. The OTA orchestrator performs division and transcoding processing on the vehicle-mounted upgrade package, and sequentially transfers transcoded upgrade subfiles to the target to-be-upgraded vehicle-mounted device. This application provides three independent transcoding methods: a hash chain-based solution, a hash tree-based solution, and a bloom filter-based solution. Upgrade package in-vehicle transmission processes based on the three transcoding methods are described below. First, it is assumed that the OTA orchestrator shares a key k with the target to-be-upgraded vehicle-mounted device. The shared k may be static or may be temporarily generated by the OTA orchestrator and the target to-be-upgraded vehicle-mounted device.

Method 1: Hash Chain-Based Transcoding Method

1. The OTA orchestrator divides an upgrade file M into n parts: $M_1, M_2, \ldots,$ and $M_n$.

2. Form a hash chain by using $M_1, M_2, \ldots,$ and $M_n$ as follows, where H(.) represents a cryptographic hash function:

$h_n = H(M_n)$
$h_i = H(M_i, h_{i+1})$
$h_2 = H(M_2, h_3)$

3. The OTA orchestrator calculates v=MAC(k, $M_1$∥ver, $h_2$) by using the shared key k (the second key). Herein, the MAC is a standard message authentication code message authentication code, namely, the first MAC.

4. Starting from the first part, the OTA orchestrator sequentially transfers $M_i$ to the target to-be-upgraded vehicle-mounted device. For the first part, the OTA orchestrator needs to transfer v, $M_1$, ver, and $h_2$; for remaining parts, the OTA orchestrator needs to transfer only $M_i$ and $h_{i+1}$.

5. The target to-be-upgraded vehicle-mounted device sequentially performs verification on $M_i$ by using the shared key k. If verification on a part fails, the target to-be-upgraded vehicle-mounted device may request retransmission. After receiving and verifying all the parts, the target to-be-upgraded vehicle-mounted device combines all the parts into the complete upgrade file M.

Method 2: Hash Tree-Based Transcoding Method

1. The OTA orchestrator divides an upgrade file M into n parts: $M_1, M_2, \ldots,$ and $M_n$.

2. Form a binary tree by using $M_1, M_2, \ldots,$ and $M_n$. As shown in the figure: a leaf node represents data, each intermediate node includes a value of a root node that may be obtained based on a value of a subnode of the intermediate node by using hash, for example, $h_1 = H(M_1 \| ver \| M_2)$, and $h_5 = H(h_1 \| h_2)$.

3. The OTA orchestrator calculates the value of the root node by using the shared key k (the second key). As shown in the figure, for example, v=MAC(k, $h_5 \| h_6$), namely, the first MAC.

4. Starting from $M_1$ and $M_2$, the OTA orchestrator transfers two parts to the target to-be-upgraded vehicle-mounted device each time. For the first two parts, the OTA orchestrator needs to transfer v, $M_1 \| ver$, $M_2$, $h_2$, and $h_6$; for remaining parts, the OTA orchestrator needs to transfer two pieces of data and assistant verification data corresponding to the two pieces of data. In the figure, assistant verification data of $M_1$ and $M_2$ is $h_2$ and $h_6$; assistant verification data of $M_3$ and $M_4$ is blank, because verification on $M_3$ and $M_4$ can be performed by using $h_2$; assistant verification data of $M_5$ and $M_6$ is $h_4$; and assistant verification data of $M_7$ and $M_8$ is blank.

5. The target to-be-upgraded vehicle-mounted device performs verification on every two parts by using the shared key k. If verification on two parts fails, the target to-be-upgraded vehicle-mounted device may request retransmission. After receiving and verifying all the parts, the target to-be-upgraded vehicle-mounted device combines all the parts into the complete upgrade file M.

Method 3: Bloom Filter-Based Transcoding Method

A bloom filter is a storage-efficient data structure that is used to determine whether data exists in a set. An example is as follows:

An array F (Bloom Filter) with a length of $\ell$ is set, in which a value of each element is initially set to 0. t hash functions $H_1, H_2, \ldots,$ and $H_t$ are selected. Each hash function is a mapping from the set to $\{1, 2, \ldots, \ell\}$. To be specific, each element of the set is mapped to any value in $\{1, 2, \ldots, \ell\}$. A method for adding an element e in the set to the bloom filter is as follows: calculating $H_i(e)$, and modifying a location directed by $H_i(e)$ in F to 1. A method for determining, based on F, whether an element e' exists in the set is calculating all hash values of e', and only when all locations directed by all the hash values in F are 1, determining that the element exists in the set.

Using the bloom filter to determine whether the element exists in the set has the following features:

It can be determined that the element is not in the set provided that a location indicated by one hash value of the element in F is 0; if locations indicated by all the hash values of the element are 1, although it can be determined that the element is in the set, false positive exists, and a probability of false positive is where n is a quantity of elements that are added to the bloom filter.

$$\left(1 - e^{-1\frac{n}{l}}\right)^2$$

where n is a quantity of elements that are added to the bloom filter.

Time for adding an element or determining whether an element is in the set is a constant.

An upgrade package in-vehicle transmission process based on bloom filter transcoding is as follows:

1. The OTA orchestrator divides an upgrade file M into n parts: $M_1, M_2, \ldots,$ and $M_n$.

2. The OTA orchestrator sets a bloom filter F and adds $M_1, M_2, \ldots,$ and $M_n$ to F, and calculates v=MAC(k, F), namely, the second MAC, by using the shared key k (the second key).

3. Transfer F and v to the target to-be-upgraded vehicle-mounted device, and sequentially transfer $M_i$.

4. The target to-be-upgraded vehicle-mounted device first performs verification on F by using the shared key k, and may request to retransmit F and v if verification fails; when receiving each determines whether $M_i$ is in F, and if $M_i$ is not in F, requests to retransmit $M_i$; and finally, combines all the received $M_1, M_2, \ldots,$ and $M_n$ into the complete upgrade file M.

For the foregoing three manners, it is assumed that confidentiality of the upgrade file does not need to be protected during in-vehicle communication. If confidentiality of the upgrade file needs to be protected, the OTA orchestrator needs to first obtain a ciphertext by encrypting each $M_i$ (by using the third key in this application), and replaces $M_i$ with $C_i$ in the foregoing hash chain-based method, hash tree-based method, or bloom filter-based method. In other words, encryption is performed by using the third key, as described above. After receiving each part, the target to-be-upgraded vehicle-mounted device encrypts $C_i$ to obtain $M_i$ after authenticity is verified. It should be noted that the key for encryption is preferably different from the key used in the MAC processing. For example, if the shared k is sufficiently long, k may be divided into two different keys; otherwise, two keys may be generated based on k by using a key derivation function.

The foregoing three manners of dividing and transcoding the upgrade file by the OTA orchestrator have the following benefits: The target to-be-upgraded vehicle-mounted device does not need to perform verification on the digital signature but performs only a symmetric cryptology operation, that is, calculating the MAC and hash. In addition, the symmetric cryptology operation is much more efficient than the public key cryptology operation. Furthermore, the to-be-upgraded vehicle-mounted device is capable of performing segment verification on validity of each segment, and therefore can detect an invalid or erroneous segment in a timely manner, to request the OTA orchestrator to retransmit the segment, instead of retransmitting the entire upgrade file. If common transcoding rather than segment transcoding is performed, that is, if a MAC is used instead of a digital signature, the target to-be-upgraded vehicle-mounted device cannot precisely locate an error location, and needs to request the OTA orchestrator to retransmit the entire upgrade file. Therefore, according to this embodiment of the present invention, not only an error location can be precisely located, computation workload and computation complexity of the to-be-upgraded device in the vehicle can be reduced, so that the to-be-upgraded vehicle-mounted device can be securely and efficiently upgraded.

In the foregoing description, the OTA orchestrator divides the upgrade file. In another embodiment, division may be performed by an upgrade package developer. Specifically, the hash chain-based method is used as an example.

1. The upgrade package developer divides an upgrade file M into n parts: $M_1, M_2, \ldots,$ and $M_n$.

2. Form a hash chain by using $M_1, M_2, \ldots,$ and $M_n$ as follows, where H(.) represents a cryptographic hash function:

$h_n = H(M_n)$
$h_i = H(M_i, h_{i+1})$
$h_2 = H(M_2, h_3)$

3. Calculate $\sigma = \text{Sign}_D(M\|\text{ver}, h2)$ by using a signature private key. The signature is the second digital signature in this application, and the signature private key is the fourth key.

4. Use [M, ver, σ] as an upgrade package and deliver the upgrade package to the upgrade server. Optionally, $M_1, M_2, \ldots,$ and $M_n$ may be further encrypted to ensure confidentiality of the vehicle-mounted upgrade package. Refer to the foregoing related descriptions about encrypting the upgrade file and ensuring confidentiality of the upgrade file. Details are not described herein again.

When the OTA orchestrator needs to obtain the upgrade package from the upgrade server, starting from the first part, the upgrade server sequentially transfers $M_i$ to the target to-be-upgraded vehicle-mounted device. For the first part, the upgrade server needs to transfer σ, $M_1$, ver, and $h_2$; for remaining parts, the upgrade server needs to transfer only $M_i$ and $h_{i+1}$.

For the first part $M_1$, the OTA orchestrator needs to perform verification on the digital signature σ; for the remaining parts $M_i$, the OTA orchestrator needs to perform verification only on $h_i=H(M_i, h_{i+1})$.

After receiving and verifying all the parts, the OTA orchestrator performs transcoding as described above, that is, calculates v=MAC(k, $M_1$||ver, $h_2$) by using the shared key k (the fifth key in this application). The MAC is the second MAC. For subsequent upgrade package in-vehicle transmission, upgrade and confirmation processes are the same as those in the method 1, method 2, and method 3. In addition, for the hash tree-based transcoding manner and the bloom filter-based transcoding manner, refer to this embodiment of the present invention and the foregoing method 2 and method 3. Details are not described herein again.

In this embodiment of the present invention, after authenticity verification is completed on the vehicle-mounted upgrade package in the vehicle-mounted control device (optionally, confidentiality verification may be further performed before the authenticity verification), the vehicle-mounted control device needs to transmit the plurality of upgrade files on which authenticity verification (optionally, confidentiality verification may be included) succeeds, to a corresponding to-be-upgraded vehicle-mounted device in the vehicle-mounted system. A sender and a receiver for transmission are changed, that is, out-of-vehicle transmission of the vehicle-mounted upgrade package becomes in-vehicle transmission of the vehicle-mounted upgrade package. Therefore, authenticity verification or even confidentiality verification needs to be performed again. In addition, according to this embodiment of the present invention, signature verification requiring large computation workload and high computation complexity is implemented on a vehicle-mounted control device side, and MAC verification requiring small computation workload and low computation complexity is still implemented on the to-be-upgraded vehicle-mounted device. This not only ensures high upgrade efficiency of a to-be-upgraded vehicle-mounted device having a weak capability, but also ensures security inside and outside a vehicle in a vehicle-mounted upgrade process.

Based on the foregoing descriptions, it can be understood that this application provides the following key technical points.

A first point is authenticity of the vehicle-mounted upgrade package: The to-be-upgraded vehicle-mounted device checks authenticity of the upgrade package. To ensure authenticity of the upgrade package, a digital signature for the upgrade package needs to be provided by the developer or the upgrade server (package server). When the upgrade package arrives at the OTA orchestrator, the OTA orchestrator helps the to-be-upgraded vehicle-mounted device to perform verification on the digital signature. Then, the OTA orchestrator performs a transcoding operation. A symmetric cryptology is used in the transcoding operation to provide upgrade package authenticity verification for the to-be-upgraded vehicle-mounted device. It is assumed that the OTA orchestrator shares a key with each to-be-upgraded vehicle-mounted device. The key may be delivered by the OTA orchestrator in advance, and a specific delivery process is beyond the scope of this application. The upgrade package is divided into a plurality of parts through the transcoding operation, and is transmitted to the to-be-upgraded vehicle-mounted device part by part. Specifically, a hash chain-based transcoding operation, a hash tree-based transcoding operation, and a bloom filter-based transcoding operation are provided. Advantages of a part-by-part transcoding operation and a part-by-part transmission technology are as follows: A computation capacity limitation on a vehicle-mounted device and a bandwidth limitation on an in-vehicle communications network are taken into full consideration. After an upgrade package transmission error occurs, the vehicle-mounted device can find a part suffering the transmission error, so that only the error part rather than the entire upgrade package is requested to be retransmitted.

A second point is confidentiality of the vehicle-mounted upgrade package: An attacker may analyze content of the upgrade package by using a reverse engineering technology. Therefore, confidentiality of the vehicle-mounted upgrade package needs to be protected. Protection solutions are provided based on the following two cases:

a. If an upgrade package is not encrypted in an upgrade server, when a vehicle-mounted telematics obtains the upgrade package, the upgrade server needs to perform identity authentication on the vehicle-mounted telematics and establish a secure channel, to send the upgrade package through the secure channel.

b. If an upgrade package is encrypted (by using a symmetric key) in an upgrade server, a vehicle-mounted telematics needs to obtain the encryption key from a key server, and other steps are the same as those in the case a.

A last point is a capability-based upgrade policy: Different vehicle-mounted devices have different computation capabilities and storage resources. For example, a vehicle-mounted telematics, a gateway, and a VCU usually have a relatively strong capability, but most vehicle-mounted devices (ECU) have a relatively weak processing capability. Therefore, the capability-based upgrade policy is provided. To be specific, an AB system updates upgrade mode needs to be used for a strong-capability or key device, while for a weak-capability device, an old version of firmware or software of the to-be-upgraded vehicle-mounted device may be backed up with the help of the OTA orchestrator, to perform rollback when upgrade fails.

The foregoing describes in detail the method in the embodiments of the present invention. The following provides a related apparatus in the embodiments of the present invention.

FIG. 6 is a schematic structural diagram of a vehicle-mounted upgrade apparatus according to an embodiment of the present invention. The vehicle-mounted upgrade apparatus is applied to a vehicle-mounted system, and the vehicle-mounted system includes a vehicle-mounted control device and one or more to-be-upgraded vehicle-mounted devices. The vehicle-mounted upgrade apparatus 10 may be the vehicle-mounted control device in the foregoing system, and the apparatus 10 may include an upgrade package obtaining unit 101, an upgrade management unit 102, and an upgrade transmission unit 103. The following specifically describes the units.

The upgrade package obtaining unit 101 is configured to obtain a vehicle-mounted upgrade package, where the vehicle-mounted upgrade package includes a plurality of upgrade files, and each upgrade file is used to upgrade at least one to-be-upgraded vehicle-mounted device.

The upgrade management unit 102 is configured to perform security verification on the plurality of upgrade files.

The upgrade transmission unit 103 is configured to send a target upgrade file to a target to-be-upgraded vehicle-mounted device that is to be upgraded by using the target upgrade file, where the target upgrade file is an upgrade file on which security verification succeeds in the plurality of upgrade files.

In a possible implementation, the vehicle-mounted upgrade package includes a first digital signature; and the upgrade management unit is specifically configured to perform digital signature verification on the plurality of upgrade files by using the first digital signature.

In a possible implementation, the apparatus 10 further includes:
an identity authentication unit, configured to send identity authentication information to the upgrade server; and
a channel establishing unit, configured to: if the identity authentication information is authenticated by the upgrade server, establish a secure channel between the vehicle-mounted control device and the upgrade server; and
the upgrade package obtaining unit is specifically configured to obtain the vehicle-mounted upgrade package from the upgrade server through the secure channel.

In a possible implementation, the vehicle-mounted upgrade package is encrypted by using a first key, and the first key is a symmetric key; and the apparatus further includes:
a key obtaining unit, configured to obtain the first key from a key server; and
the apparatus 10 further includes:
a decryption unit, configured to: after digital signature verification is performed on the plurality of upgrade files by using the first digital signature, decrypt, for the vehicle-mounted control device, the plurality of upgrade files by using the first key if the digital signature verification succeeds.

In a possible implementation, the upgrade transmission unit 103 is specifically configured to:
divide the target upgrade file into a plurality of upgrade subfiles; generate a plurality of mutually associated data blocks from the plurality of upgrade subfiles by using a preset algorithm, and generate a first message authentication code MAC of the plurality of data blocks by using a second key, where the second key is a symmetric algorithm key; and sequentially send, to the target to-be-upgraded vehicle-mounted device, the plurality of data blocks that carry the first MAC.

In a possible implementation, the apparatus 10 further includes:
an encryption unit, configured to encrypt each of the plurality of upgrade subfiles by using a third key; and
the upgrade transmission unit 103 is specifically configured to:
divide the target upgrade file into the plurality of upgrade subfiles; generate, for the vehicle-mounted control device by using the preset algorithm, the plurality of mutually associated data blocks from the plurality of upgrade subfiles that are encrypted by using the third key, and generate the first message authentication code MAC of the plurality of data blocks by using the second key, where the second key is a symmetric algorithm key; and sequentially send, to the target to-be-upgraded vehicle-mounted device, the plurality of data blocks that carry the first MAC.

In a possible implementation, the target upgrade file includes a plurality of upgrade subfiles, a plurality of mutually associated data blocks are generated from the plurality of upgrade subfiles by using a preset algorithm, and the plurality of upgrade subfiles carry a second digital signature of the plurality of data blocks that is generated by using a fourth key, where the fourth key is an asymmetric key;
the upgrade management unit 102 is specifically configured to check, for the vehicle-mounted control device, the second digital signature of the plurality of data blocks; and the upgrade transmission unit 103 is specifically configured to: generate a second MAC of the plurality of data blocks by using a fifth key, where the fifth key is a symmetric algorithm key; and sequentially send, to the target to-be-upgraded vehicle-mounted device, the plurality of data blocks that carry the second MAC.

In a possible implementation, the preset algorithm includes any one of a hash chain algorithm, a hash tree algorithm, and a bloom filter algorithm.

In a possible implementation, the apparatus 10 further includes:
a retransmission unit, configured to retransmit a target data block to the target to-be-upgraded vehicle-mounted device, where the target data block is a data block on which verification fails on the target to-be-upgraded vehicle-mounted device in the plurality of data blocks.

It should be noted that, for a function of each functional unit of the vehicle-mounted upgrade apparatus 10 described in this embodiment of the present invention, refer to related descriptions in the method embodiments shown in FIG. 1 to FIG. 5. Details are not described herein again.

Figure 7:
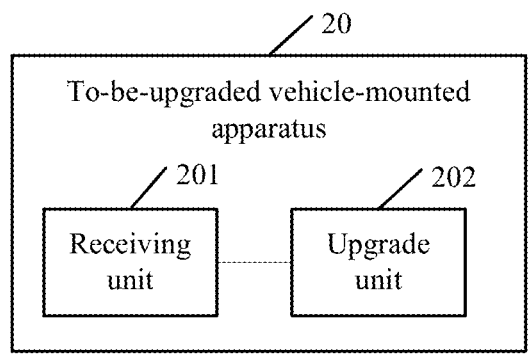
FIG. 7 is a schematic structural diagram of a to-be-upgraded vehicle-mounted apparatus according to an embodiment of the present invention.

FIG. 7 is a schematic structural diagram of a to-be-upgraded vehicle-mounted apparatus according to an embodiment of the present invention. The to-be-upgraded vehicle-mounted apparatus 20 is applied to a vehicle-mounted system, and the vehicle-mounted system includes a vehicle-mounted control device and one or more to-be-upgraded vehicle-mounted devices. The to-be-upgraded vehicle-mounted apparatus 20 may be the to-be-upgraded vehicle-mounted device in the foregoing system, and the apparatus 20 may include a receiving unit 201 and an upgrade unit 202. The following specifically describes the units.

The receiving unit 201 is configured to receive a target upgrade file sent by the vehicle-mounted control device, where the target upgrade file is an upgrade file on which security verification performed by the vehicle-mounted control device succeeds and that is used to upgrade at least the target to-be-upgraded vehicle-mounted device.

The upgrade unit 202 is used to perform secure upgrade by using the target upgrade file.

In a possible implementation, the upgrade unit 202 is specifically configured to:
use an A/B system updates upgrade mode, and perform secure upgrade by using the target upgrade file, where the to-be-upgraded vehicle-mounted device is a first to-be-upgraded vehicle-mounted device whose resource storage capability and/or processing capability exceed/exceeds a preset value or a first to-be-upgraded vehicle-mounted device that is specified in advance.

In a possible implementation, the target upgrade file includes a plurality of upgrade subfiles; and the receiving unit 201 is specifically configured to:
sequentially receive the plurality of data blocks that carry the first MAC and that are sent by the vehicle-mounted control device, where the plurality of data blocks are a plurality of mutually associated data blocks that are generated from the plurality of upgrade subfiles by using a preset algorithm, the first MAC is a message authentication code of the plurality of data blocks that is generated by using a second key, and the second key is a symmetric key; and
the upgrade unit 202 is specifically configured to:
sequentially perform verification on the plurality of data blocks based on the preset algorithm by using the second key; and when all the plurality of data blocks are verified, combine the plurality of sequentially verified data blocks for upgrade.

In a possible implementation, the plurality of upgrade subfiles are encrypted by using a third key; and the upgrade unit 202 is specifically configured to:

sequentially perform verification on the plurality of data blocks based on the preset algorithm by using the second key; when all the plurality of data blocks are verified, decrypt each of the plurality of sequentially verified data blocks by using the third key; and combine the plurality of data blocks that are decrypted by using the third key for upgrade.

In a possible implementation, the receiving unit 201 is specifically configured to:

sequentially receive the plurality of data blocks that carry a second MAC and that are sent by the vehicle-mounted control device, where the plurality of data blocks are a plurality of mutually associated data blocks that are generated from the plurality of upgrade subfiles by using a preset algorithm, the second MAC is a message authentication code of the plurality of data blocks that is generated by using a fifth key, and the fifth key is a symmetric algorithm; and the upgrade unit 202 is specifically configured to:

sequentially perform verification on the plurality of data blocks based on the preset algorithm by using the fifth key; and when all the plurality of data blocks are verified, combine the plurality of sequentially verified data blocks for upgrade.

In a possible implementation, the apparatus 20 further includes:

a retransmission unit, configured to re-obtain a target data block from the vehicle-mounted control device, where the target data block is a data block on which verification fails on the target to-be-upgraded vehicle-mounted device in the plurality of data blocks.

It should be noted that, for a function of each functional unit of the to-be-upgraded vehicle-mounted apparatus 20 described in this embodiment of the present invention, refer to related descriptions in the method embodiments shown in FIG. 1 to FIG. 6. Details are not described herein again.

Figure 8:
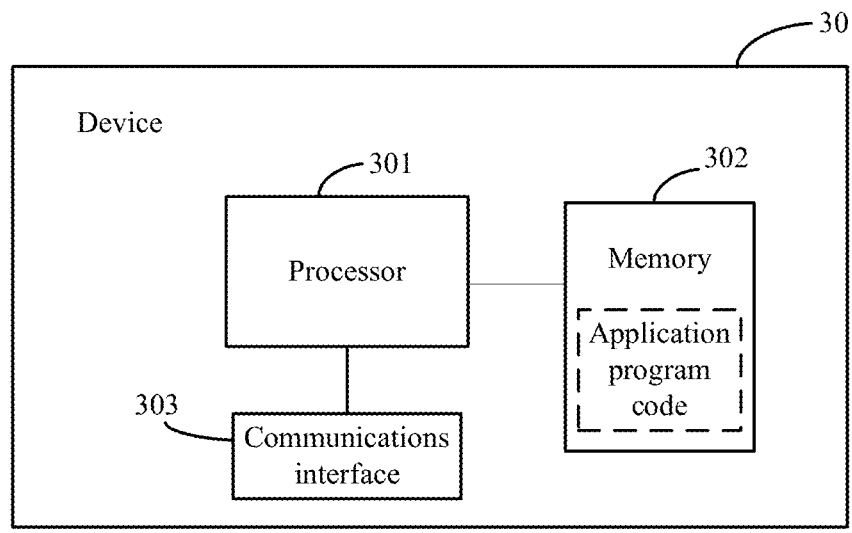
FIG. 8 is a schematic structural diagram of a device according to an embodiment of the present invention.

FIG. 8 is a schematic structural diagram of a device according to an embodiment of the present invention. Both the to-be-upgraded vehicle-mounted apparatus 10 and the to-be-upgraded vehicle-mounted apparatus 20 may be implemented in a structure in FIG. 8. The device 30 includes at least one processor 301, at least one memory 302, and at least one communications interface 303. In addition, the device may further include general-purpose components such as an antenna, and details are not described herein.

The processor 301 may be a general-purpose central processing unit (CPU), a microprocessor, an application-specific integrated circuit (ASIC), or one or more integrated circuits for controlling execution of the foregoing solution program.

The communications interface 303 is configured to communicate with another device such as an upgrade server, a key server, or an in-vehicle device, or with a communications network.

The memory 302 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor by using a bus. Alternatively, the memory may be integrated with the processor.

The memory 302 is configured to store application program code for executing the foregoing solution, and the processor 301 controls the execution. The processor 301 is configured to execute the application program code stored in the memory 302.

When the device shown in FIG. 8 is the vehicle-mounted device upgrade apparatus 10, code stored in the memory 302 may be used to perform the vehicle-mounted device upgrade method provided in FIG. 5, for example, obtaining a vehicle-mounted upgrade package, where the vehicle-mounted upgrade package includes a plurality of upgrade files, and each upgrade file is used to upgrade at least one to-be-upgraded vehicle-mounted device; performing security verification on the plurality of upgrade files; and sending a target upgrade file to a target to-be-upgraded vehicle-mounted device that is to be upgraded by using the target upgrade file, where the target upgrade file is an upgrade file on which security verification succeeds in the plurality of upgrade files.

It should be noted that, for a function of each functional unit of the vehicle-mounted device upgrade apparatus 10 described in this embodiment of the present invention, refer to related descriptions of steps S502 and S503 in the method embodiment shown in FIG. 5. Details are not described herein again.

When the device shown in FIG. 8 is the to-be-upgraded vehicle-mounted apparatus 20, the code stored in the memory 302 may be used to perform the vehicle-mounted device upgrade method provided in FIG. 5, for example, receiving a target upgrade file sent by a vehicle-mounted control device, where the target upgrade file is an upgrade file on which security verification performed by the vehicle-mounted control device succeeds and that is used to upgrade at least the target to-be-upgraded vehicle-mounted device; and performing secure upgrade by using the target upgrade file.

It should be noted that, for a function of each functional unit of the to-be-upgraded vehicle-mounted apparatus 20 described in this embodiment of the present invention, refer to related descriptions of steps S504 and S505 in the method embodiment shown in FIG. 5. Details are not described herein again.

Figure 9:
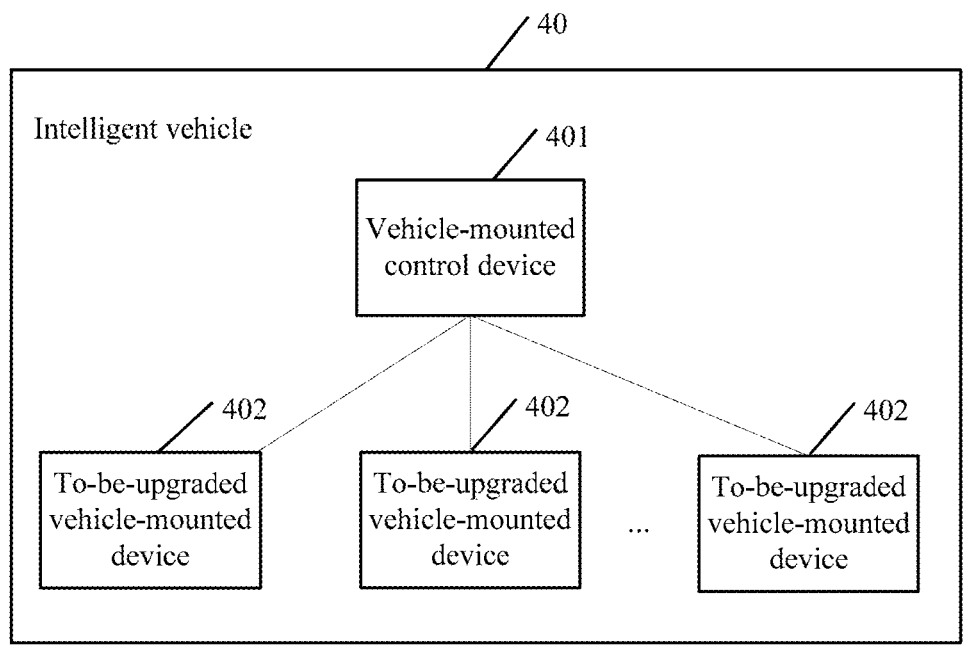
FIG. 9 is a schematic structural diagram of an intelligent vehicle according to an embodiment of the present invention.

FIG. 9 is a schematic structural diagram of an intelligent vehicle according to an embodiment of the present invention. The intelligent vehicle 40 includes a vehicle-mounted control device 401 and at least one to-be-upgraded vehicle-mounted device 402.

The vehicle-mounted device 401 is configured to obtain a vehicle-mounted upgrade package, perform security verification on a plurality of upgrade files in the vehicle-mounted upgrade package, and send a target upgrade file to a target to-be-upgraded vehicle-mounted device that is to be upgraded by using the target upgrade file, where each upgrade file is used to upgrade at least one to-be-upgraded vehicle-mounted device, and the target upgrade file is an upgrade file on which security verification succeeds in the plurality of upgrade files.

The to-be-upgraded vehicle-mounted device 402 is configured to receive the target upgrade file sent by the vehicle-mounted control device, and perform secure upgrade by using the target upgrade file, where the to-be-upgraded vehicle-mounted device is the target to-be-upgraded vehicle-mounted device.

In a possible implementation, the vehicle-mounted control device 401 is specifically configured to perform digital signature verification on the plurality of upgrade files by using the first digital signature.

In a possible implementation, the vehicle-mounted control device 401 is specifically configured to:

send identity authentication information to the upgrade server, if the identity authentication information is authenticated by the upgrade server, establish a secure channel between the vehicle-mounted control device and the upgrade server, and obtain the vehicle-mounted upgrade package from the upgrade server through the secure channel; or the vehicle-mounted upgrade package is encrypted by using a first key, and the first key is a symmetric key; and the vehicle-mounted control device 401 is specifically configured to:

obtain the first key from a key server, and after digital signature verification performed on the plurality of upgrade files by using the first digital signature succeeds, decrypt the plurality of upgrade files by using the first key.

In a possible implementation, the vehicle-mounted control device 401 is specifically configured to:

divide the target upgrade file into a plurality of upgrade subfiles, generate a plurality of mutually associated data blocks by using a preset algorithm, generate a first message authentication code MAC of the plurality of data blocks by using a second key, and sequentially send, to the target to-be-upgraded vehicle-mounted device, the plurality of data blocks that carry the first MAC, where the second key is a symmetric algorithm key; and the to-be-upgraded vehicle-mounted device 402 is specifically configured to:

sequentially receive the plurality of data blocks that carry the first MAC and that are sent by the vehicle-mounted control device; sequentially perform verification on the plurality of data blocks based on the preset algorithm by using the second key; and when all the plurality of data blocks are verified, combine the plurality of sequentially verified data blocks for upgrade.

In a possible implementation, the vehicle-mounted control device 401 is specifically configured to:

encrypt each of the plurality of upgrade subfiles by using a third key, and generate, by using the preset algorithm, the plurality of mutually associated data blocks from the plurality of upgrade subfiles that are encrypted by using the third key; and the to-be-upgraded vehicle-mounted device 402 is specifically configured to:

when all the plurality of data blocks are verified, decrypt each of the plurality of sequentially verified data blocks by using the third key, and combine the plurality of data blocks that are decrypted by using the third key for upgrade.

In a possible implementation, the target upgrade file includes a plurality of upgrade subfiles, a plurality of mutually associated data blocks are generated from the plurality of upgrade subfiles by using a preset algorithm, and the plurality of upgrade subfiles carry a second digital signature of the plurality of data blocks that is generated by using a fourth key, where the fourth key is an asymmetric key;

the vehicle-mounted control device 401 is specifically configured to:

check the second digital signature of the plurality of data blocks, generate a second MAC of the plurality of data blocks by using a fifth key, and sequentially send, to the target to-be-upgraded vehicle-mounted device, the plurality of data blocks that carry the second MAC, where the fifth key is a symmetric algorithm key; and the to-be-upgraded vehicle-mounted device 402 is specifically configured to:

sequentially receive the plurality of data blocks that carry the second MAC and that are sent by the vehicle-mounted control device; sequentially perform verification on the plurality of data blocks based on the preset algorithm by using the fifth key; and when all the plurality of data blocks are verified, combine the plurality of sequentially verified data blocks for upgrade.

It should be noted that, for the vehicle-mounted control device 401 and the to-be-upgraded vehicle-mounted device 402 of the intelligent vehicle 40 described in this embodiment of the present invention, refer to related descriptions of the vehicle-mounted control device and the to-be-upgraded vehicle-mounted device in the method embodiment shown in FIG. 5. Details are not described herein again.

It can be understood that, the intelligent vehicle 40 may further be integrated with functions of an intelligent driving system, a life service system, a safety protection system, a positioning service system, a car service system, and the like by using computer, modern sensing, information convergence, communications, artificial intelligence, automatic control, and other technologies. This is not specifically limited in this application, and details are not described herein.

An embodiment of the present invention further provides a computer storage medium. The computer storage medium stores a program, and when being executed, the program performs some or all of the steps described in any one of the foregoing method embodiments.

An embodiment of the present invention further provides a computer program. The computer program includes an instruction, and when the computer program is executed by a computer, the computer is enabled to perform some or all of the steps of any one of the vehicle-mounted device upgrade methods.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all are examples of the embodiments, and the related actions and modules are not necessarily required by this application.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A vehicle-mounted device upgrade method, applied to a vehicle, wherein the vehicle comprises a vehicle-mounted control device and one or more to-be-upgraded vehicle-mounted devices, and the method comprises:

obtaining, by the vehicle-mounted control device, a vehicle-mounted upgrade package, wherein the vehicle-mounted upgrade package comprises an upgrade file used to upgrade at least one of the one or more to-be-upgraded vehicle-mounted devices;

performing, by the vehicle-mounted control device, security verification on the upgrade file;

responsive to determining that the security verification on the upgrade file succeeds, generating, by the vehicle-mounted control device, a plurality of data blocks from a plurality of upgrade subfiles of the upgrade file;

generating, by the vehicle-mounted control device, a first message authentication code (MAC) of the plurality of data blocks using a second key, wherein the second key is a symmetric algorithm key; and sending, by the vehicle-mounted control device, the plurality of data blocks and the first MAC to a target to-be-upgraded vehicle-mounted device that is to be upgraded wherein the first MAC is used by the target to-be-upgraded vehicle-mounted device to authenticate the plurality of data blocks.

2. The method according to claim 1, wherein the vehicle-mounted upgrade package comprises a first digital signature; and the performing, by the vehicle-mounted control device, the security verification on the upgrade file comprises:

performing, by the vehicle-mounted control device, digital signature verification on the upgrade file using the first digital signature.

3. The method according to claim 2, wherein the method further comprises:

sending, by the vehicle-mounted control device, identity authentication information to an upgrade server; and responsive to determining that the identity authentication information is authenticated by the upgrade server, establishing a secure channel between the vehicle-mounted control device and the upgrade server; and wherein the obtaining, by the vehicle-mounted control device, the vehicle-mounted upgrade package comprises:

obtaining, by the vehicle-mounted control device, the vehicle-mounted upgrade package from the upgrade server through the secure channel.

4. The method according to claim 2, wherein the vehicle-mounted upgrade package is encrypted using a first key, and the first key is a symmetric key; and the method further comprises:

obtaining, by the vehicle-mounted control device, the first key from a key server; and after the performing, by the vehicle-mounted control device, digital signature verification on the upgrade file by using the first digital signature, the method comprises:

decrypting, by the vehicle-mounted control device, the upgrade file using the first key responsive to determining that the digital signature verification succeeds.

5. The method according to claim 1, wherein the method further comprises:

encrypting, by the vehicle-mounted control device, each of the plurality of upgrade subfiles using a third key; and the generating, by the vehicle-mounted control device, the plurality of data blocks from the plurality of upgrade subfiles comprises:

generating, by the vehicle-mounted control device by using a preset algorithm, the plurality of data blocks from the plurality of upgrade subfiles that are encrypted using the third key.

6. The method according to claim 5, wherein the preset algorithm comprises one of a hash chain algorithm, a hash tree algorithm, or a bloom filter algorithm.

7. The method according to claim 1, wherein the method further comprises:

retransmitting, by the vehicle-mounted control device, a target data block to the target to-be-upgraded vehicle-mounted device, wherein the target data block is a data block on which verification fails on the target to-be-upgraded vehicle-mounted device in the plurality of data blocks.

8. An intelligent vehicle, wherein the intelligent vehicle comprises a vehicle-mounted control device and at least one to-be-upgraded vehicle-mounted device, wherein:

the vehicle-mounted control device is configured to obtain a vehicle-mounted upgrade package, perform security verification on an upgrade file in the vehicle-mounted upgrade package, responsive to determining that that the security verification on the upgrade file succeeds, generate a plurality of data blocks from a plurality of upgrade subfiles in the upgrade file, generate a first message authentication code (MAC) of the plurality of data blocks using a second key, wherein the second key is a symmetric algorithm key, and send the plurality of data blocks and the first MAC to a target to-be-upgraded vehicle-mounted device that is to be upgraded, wherein the upgrade file is used to upgrade the target to-be-upgraded vehicle-mounted device; and the target to-be-upgraded vehicle-mounted device is configured to receive the plurality of data blocks and the first MAC sent by the vehicle-mounted control device, perform verification on the plurality of data blocks using the first MAC, in case that all the plurality of data blocks are verified, combine the plurality of data blocks for upgrade to generate a combined file and perform a secure upgrade using the combined file.

9. The intelligent vehicle according to claim 8, wherein the vehicle-mounted control device is configured to:

perform digital signature verification on the upgrade file using a first digital signature.

10. The intelligent vehicle according to claim 9, wherein the vehicle-mounted control device is configured to:

send identity authentication information to an upgrade server, and responsive to determining that the identity authentication information is authenticated by the upgrade server, establish a secure channel between the vehicle-mounted control device and the upgrade server, and obtain the vehicle-mounted upgrade package from the upgrade server through the secure channel; or the vehicle-mounted upgrade package is encrypted using a first key, and the first key is a symmetric key; and the vehicle-mounted control device is configured to:

obtain the first key from a key server, and after digital signature verification performed on the upgrade file using the first digital signature succeeds, decrypt the upgrade file using the first key.

11. The intelligent vehicle according to claim 8, wherein the vehicle-mounted control device is configured to:

encrypt each of the plurality of upgrade subfiles using a third key, and generate, using a preset algorithm, the plurality of data blocks from the plurality of upgrade subfiles that are encrypted using the third key; and the target to-be-upgraded vehicle-mounted device is configured to:

responsive to determining that all the plurality of data blocks are verified, decrypt each of the plurality of data blocks using the third key, and combine the plurality of data blocks that are decrypted using the third key for upgrade.

12. A vehicle-mounted device upgrade apparatus, comprising:

a processor, configured to obtain a vehicle-mounted upgrade package from an upgrade server, wherein the vehicle-mounted upgrade package comprises an upgrade file, and the upgrade file is used to upgrade at least one to-be-upgraded vehicle-mounted device; and the processor further configured to perform security verification on the upgrade file, responsive to determining that the security verification on the upgrade file succeeds, generate a plurality of data blocks from a plurality of upgrade subfiles in the upgrade file and generate a first message authentication code (MAC) of the plurality of data blocks using a second key, wherein the second key is a symmetric algorithm key; and a transceiver, configured to send the plurality of data blocks and the first MAC to a target to-be-upgraded vehicle-mounted device that is to be upgraded, wherein the first MAC is used by the target to-be-upgraded vehicle-mounted device to authenticate the plurality of data blocks.

13. The apparatus according to claim 12, wherein the vehicle-mounted upgrade package comprises a first digital signature; and the processor is configured to perform digital signature verification on the upgrade file using the first digital signature.

14. The apparatus according to claim 13, wherein the processor is further configured to:

send identity authentication information to the upgrade server; and responsive to determining that the identity authentication information is authenticated by the upgrade server, establish a secure channel via the transceiver between the vehicle-mounted control device and the upgrade server; and obtain the vehicle-mounted upgrade package from the upgrade server through the secure channel.

15. The apparatus according to claim 13, wherein the vehicle-mounted upgrade package is encrypted using a first key, and the first key is a symmetric key; and the processor is further configured to:

obtain the first key from a key server; and after the digital signature verification is performed on the upgrade file using the first digital signature, decrypt, for the vehicle-mounted control device, the upgrade file using the first key responsive to success of the digital signature verification.

* * * * *